United States Patent
Lucas et al.

(10) Patent No.: US 6,568,274 B1
(45) Date of Patent: May 27, 2003

(54) CAPACITIVE BASED PRESSURE SENSOR DESIGN

(75) Inventors: Paul D. Lucas, Melrose, MA (US); John Denner, Lynn, MA (US); Chris P. Grudzien, Lowell, MA (US); Jeff Lischer, Acton, MA (US); Kristen Weight, Stow, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 09/637,980

(22) Filed: Aug. 11, 2000

Related U.S. Application Data

(63) Continuation-in-part of application No. 09/410,711, filed on Oct. 1, 1999, and a continuation-in-part of application No. 09/410,327, filed on Oct. 1, 1999, and a continuation-in-part of application No. 09/491,279, filed on Jan. 26, 2000, which is a continuation of application No. 09/018,395, filed on Feb. 4, 1998, now Pat. No. 6,029,525.

(51) Int. Cl.⁷ .................................................. G01L 9/12

(52) U.S. Cl. ...................................................... 73/718

(58) Field of Search .......................... 713/718; 73/724, 73/728, 861, 706, 152, 718; 361/283, 283.4; 340/196

(56) References Cited

U.S. PATENT DOCUMENTS

| | | | |
|---|---|---|---|
| 2,416,557 A | 2/1947 | Wiener | 179/180 |
| 2,751,530 A | 6/1956 | Armstrong | 317/246 |
| 2,753,515 A | 7/1956 | Rickner | 323/74 |
| 2,755,419 A | 7/1956 | Hollmann | 317/249 |
| 2,800,796 A | 7/1957 | Westcott et al. | |
| 2,907,320 A | 10/1959 | Weese et al. | 128/2 |

(List continued on next page.)

FOREIGN PATENT DOCUMENTS

| | | |
|---|---|---|
| FR | 895938 | 1/1945 |
| GB | 2188155 | 9/1987 |

(List continued on next page.)

OTHER PUBLICATIONS

Baratron® Absolute Pressure Transmitters 400 Series, ©1996 MKS Instruments, Inc., Andover, MA.

(List continued on next page.)

Primary Examiner—Hezron Williams
Assistant Examiner—Marissa Ferguson
(74) Attorney, Agent, or Firm—Hale and Dorr LLP

(57) ABSTRACT

A pressure transducer assembly includes a first body, a second body, a diaphragm, and an electrode. The diaphragm is mounted between the first and second bodies. The first body and the diaphragm form a first chamber. The second body and the diaphragm form a second chamber. The electrode is disposed in the first chamber. A portion of the diaphragm flexes in a first direction in response to pressure in the first chamber being greater than pressure in the second chamber. A portion of the diaphragm flexes in a second direction, opposite the first direction, in response to pressure in the second chamber being greater than pressure in the first chamber. A capacitance between the electrode and the diaphragm is representative of a difference between the pressures in the first and second chambers. In some embodiments, the electrode is suspended from a hub and spoke mounting. In some embodiments the electrode is entirely metallic. In other embodiments, the electrode includes a ceramic disk with a conductive film formed on the disk and the disk is coupled to the housing with a ceramic rod. In some embodiments, the transducer also has a low thermal coefficient of expansion member connected to the housing for reducing warping in response to temperature changes. In additional embodiments, the disk includes a groove that reduces the effects of temperature variations on a ceramic electrode.

29 Claims, 20 Drawing Sheets

U.S. PATENT DOCUMENTS

| | | | | |
|---|---|---|---|---|
| 2,999,386 A | | 9/1961 | Wolfe | 73/398 |
| 3,000,215 A | | 9/1961 | Atanasoff et al. | 73/398 |
| 3,113,459 A | | 12/1963 | Slater | 73/398 |
| 3,243,998 A | | 4/1966 | Vosteen | 73/141 |
| 3,318,153 A | | 5/1967 | Lode | 73/798 |
| 3,354,721 A | | 11/1967 | Fiske | 73/398 |
| 3,619,742 A | | 11/1971 | Rud, Jr. | 317/246 |
| 3,620,083 A | | 11/1971 | Dimeff et al. | 73/398 |
| 4,008,619 A | | 2/1977 | Alcaide et al. | 73/398 |
| 4,084,438 A | * | 4/1978 | Lee et al. | 73/706 |
| 4,120,206 A | | 10/1978 | Rud, Jr. | 73/718 |
| 4,136,603 A | | 1/1979 | Doyle, Jr. | 92/98 R |
| 4,168,517 A | | 9/1979 | Lee | 361/283 |
| 4,168,518 A | | 9/1979 | Lee | 361/283 |
| 4,229,776 A | | 10/1980 | Antikainen et al. | 361/283 |
| 4,322,775 A | | 3/1982 | Delatorre | 361/283 |
| 4,358,814 A | | 11/1982 | Lee et al. | 361/283 |
| 4,424,713 A | | 1/1984 | Kroninger, Jr. et al. | 73/718 |
| 4,434,203 A | | 2/1984 | Briefer | 428/152 |
| 4,679,643 A | | 7/1987 | Bove | 177/210 |
| 4,691,574 A | | 9/1987 | Delatorre | 73/708 |
| 4,735,090 A | | 4/1988 | Jeffrey et al. | 73/706 |
| 4,785,669 A | | 11/1988 | Benson et al. | 73/718 |
| 4,823,603 A | * | 4/1989 | Ferran et al. | 73/724 |
| 4,977,480 A | | 12/1990 | Nishihara | 361/283 |
| 5,005,421 A | | 4/1991 | Hegner et al. | 73/72 |
| 5,020,377 A | | 6/1991 | Park | 73/718 |
| 5,150,275 A | | 9/1992 | Lee et al. | 361/283 |
| 5,155,653 A | | 10/1992 | Kremidas | 361/283 |
| 5,279,163 A | * | 1/1994 | D'Antonio | 73/728 |
| 5,442,962 A | * | 8/1995 | Lee | 73/718 |
| 5,499,533 A | | 3/1996 | Miller et al. | 73/152 |
| 5,542,300 A | | 8/1996 | Lee | 73/724 |
| 5,604,315 A | | 2/1997 | Briefer et al. | 73/861 |
| 5,836,063 A | | 11/1998 | Hegner et al. | 73/718 |
| 5,911,162 A | * | 6/1999 | Denner | 73/718 |
| 5,925,824 A | | 7/1999 | Soma et al. | 73/718 |
| 5,939,639 A | * | 8/1999 | Lethbridge | 73/724 |

FOREIGN PATENT DOCUMENTS

| | | |
|---|---|---|
| WO | WO 95/06236 | 3/1995 |
| WO | WO 98/59228 | 12/1998 |
| WO | WO 99/40405 | 8/1999 |
| WO | WO 00/43745 | 7/2000 |
| WO | WO 01/25740 | 4/2001 |

OTHER PUBLICATIONS

Baratron® General Purpose Absolute Pressure Transducers, 1993 MKS Instruments, Inc.

Beynon, J.D.E. et al, "A Simple Micromanometer", Journal of Scientific Instruments, vol. 41, No. 2, Feb. 1964, pp. 111–112.

Cook, D.B. et al, "A Simple Diaphragm Micromanometer", Journal of Scientific Instruments, vol. 30, Jul. 1953, pp. 238–239.

* cited by examiner

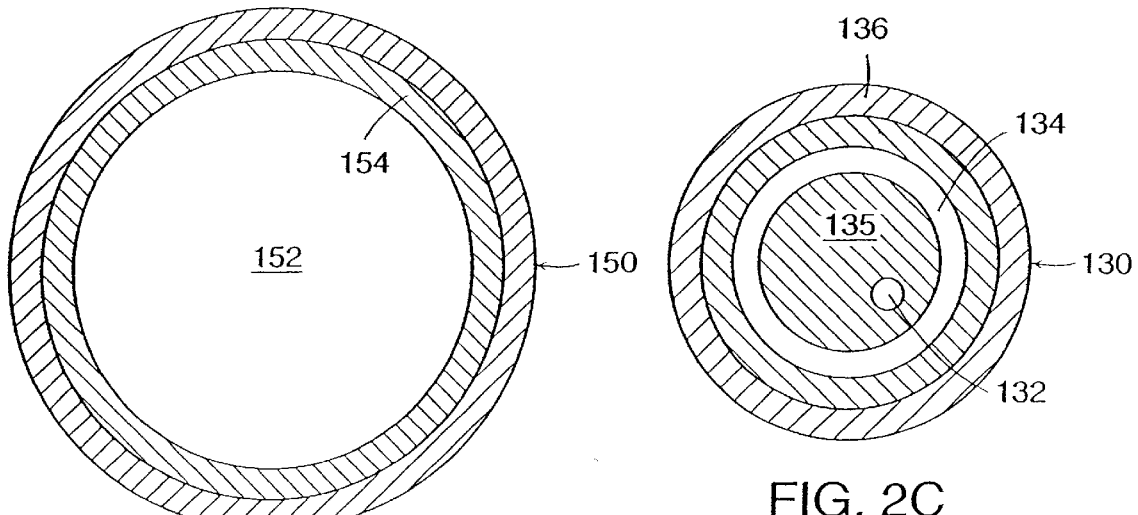
FIG. 2A
PRIOR ART
FIG. 2C
PRIOR ART
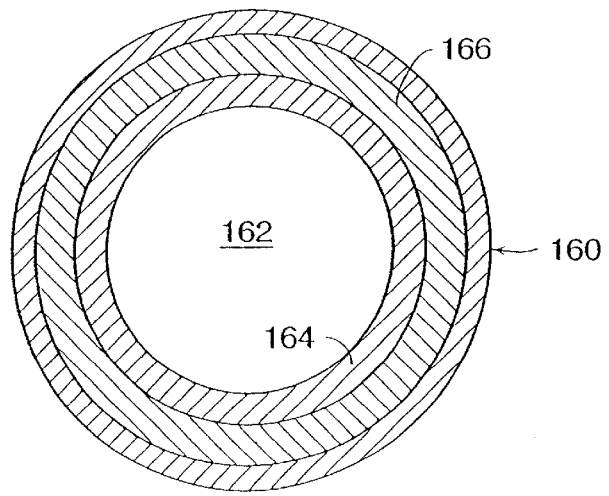
FIG. 2B
PRIOR ART

CAPACITIVE BASED PRESSURE SENSOR DESIGN

REFERENCE TO RELATED APPLICATIONS

This application is a continuation-in-part of U.S. patent application Ser. No. 09/410,711, file date Oct. 1, 1999 entitled "Capacitive Pressure Sensor with Additional Member for Reducing Thermal Mismatch," invented by Paul D. Lucas; U.S. patent application Ser. No. 09/410,327, file date Oct. 1, 1999 entitled "Capacitive Pressure Sensor," invented by Paul D. Lucas, John Denner, Chris P. Grudzien, Jeff Lischer, and Kristen Weight; and U.S. patent application Ser. No. 09/491,279, file date Jan. 26, 2000 a continuation of U.S. patent application Ser. No. 09/018,395, file date Feb. 4, 1998 entitled "Capacitive Based Pressure Sensor Design," invented by Christopher P. Grudzien, now issued as U.S. Pat. No. 6,029,525. The present invention is related to subject matter disclosed in U.S. patent application Ser. No. 08/887,821, entitled "Pressure Sensor," invented by Christopher P. Grudzien, now issued as U.S. Pat. No. 5,965,821; and to U.S. patent application Ser. No. 08/748,820, entitled "Capacitive Pressure Transducer With Improved Support," invented by John A. Denner, now issued as U.S. Pat. No. 5,911,162. The above-referenced applications have been assigned to the assignee of the present invention and are incorporated herein by this reference.

FIELD OF THE INVENTION

The present invention relates to capacitive pressure transducers.

BACKGROUND OF THE INVENTION

FIG. 1A shows a partially sectional side view of an assembled prior art capacitive pressure transducer assembly 100. FIG. 1B shows an exploded sectional side view of transducer assembly 100. For convenience of illustration, FIGS. 1A and 1B, as well as other figures in the present disclosure, are not drawn to scale. U.S. Pat. No. 4,823,603 discloses a capacitive pressure transducer assembly of the general form of transducer assembly 100.

Briefly, transducer assembly 100 includes a body that defines a first sealed interior chamber 110, and a second sealed interior chamber 112. Chambers 110 and 112 are isolated from one another by a relatively thin, flexible, conductive diaphragm 120. As will be discussed in greater detail below, diaphragm 120 is mounted so that it flexes, or deflects, in response to pressure differentials in chambers 110 and 112. Transducer assembly 100 provides a parameter that is indicative of the amount of diaphragm flexure and this parameter is therefore indirectly indicative of the differential pressure. The parameter provided by transducer assembly 100 indicative of the differential pressure is the electrical capacitance between diaphragm 120 and an electrode 130.

Transducer assembly 100 includes a P_x cover 140 and a P_x body 150 (as will be discussed below, the term "P_x" refers to an unknown pressure). FIG. 2A shows a top view of P_x body 150. P_x body 150 has a tubular shape and defines a central interior aperture 152 (shown in FIG. 2A and indicated by lines 153 in FIG. 1B). The upper surface of P_x body 150 is stepped and provides a shoulder 154 that extends around the perimeter of aperture 152. P_x body 150 also includes a lower surface 156. P_x cover 140 is a circular metallic sheet and is provided with a pressure tube 142 that defines a central aperture 144. P_x cover 140 is rigidly affixed to the lower surface 156 of P_x body 150 (e.g., by welding). Diaphragm 120 is normally a thin, circular, flexible sheet of conductive material (e.g., stainless steel). As stated above, FIGS. 1A and 1B are not drawn to scale, and diaphragm 120 is normally much thinner than illustrated in comparison to the other components of transducer assembly 100. Diaphragm 120 contacts shoulder 154 of P_x body 150 as indicated in FIG. 1A. The outer perimeter of diaphragm 120 is normally welded to P_x body 150 to rigidly hold the outer perimeter of diaphragm 120 to shoulder 154 of P_x body 150.

P_x cover 140, P_x body 150, and diaphragm 120 cooperate to define interior sealed chamber 110. P_x cover 140 defines the bottom, P_x body 150 defines the sidewalls, and diaphragm 120 defines the top of chamber 110. Fluid in tube 142 may flow through aperture 144, and through central aperture 152 (shown in FIG. 2A) into chamber 110. So, fluid in tube 142 is in fluid communication with the lower surface of diaphragm 120.

Transducer assembly 100 also includes a P_r body 160 and a P_r cover 170 (as will be discussed below, the term "P_r" refers to a reference pressure). FIG. 2B shows a top view of P_r body 160. P_r body 160 has a tubular shape and defines a central aperture 162 (shown in FIG. 2B and indicated by lines 263 in FIG. 1B). The upper surface of P_r body 160 is stepped and provides a lower shoulder 164 and an upper shoulder 166. Lower shoulder 164 extends around the perimeter of aperture 162, and upper shoulder 166 extends around the perimeter of lower shoulder 164. P_r body 160 also includes a lower surface 168 opposite to shoulders 164, 166. Lower surface 168 of P_r body 160 is rigidly affixed to the upper surface of the outer perimeter of diaphragm 120 (e.g., by welding). P_r cover 170 is a circular metallic sheet and is provided with a pressure tube 172 which defines a central aperture 174. P_r cover 170 is rigidly affixed to P_r body 160 (e.g., by welding) so that the outer perimeter of P_r cover 170 is in contact with upper shoulder 166 of P_r body 160.

P_r cover 170, P_r body 160, and diaphragm 120 cooperate to define interior sealed chamber 112. Diaphragm 120 defines the bottom, P_r body 160 defines the sidewalls, and P_r cover 170 defines the top of chamber 112. Fluid in tube 172 may flow through aperture 174, and through central aperture 162 (shown in FIG. 2B) into chamber 112. So, fluid in tube 172 is in fluid communication with the upper surface of diaphragm 120. As will be discussed below, electrode 130 is housed in, and does not interfere with the fluid flow in, chamber 112.

Electrode 130 is normally fabricated from a non-conducting (or insulating) ceramic block and has a cylindrical shape. FIG. 2C shows a bottom view of electrode 130. The lower surface of electrode 130 is stepped and includes a central face 135 and a shoulder 136 that extends around the outer perimeter of central face 135. Electrode 130 also defines an aperture 132 (shown in FIG. 2C and indicated by lines 133 in FIG. 1B). Electrode 130 further includes a relatively thin conductor 134 that is deposited (e.g., by electroplating) onto central face 135. Conductor 134 is explicitly shown in FIGS. 1B and 2C, and for convenience of illustration, conductor 134 is not shown in FIG. 1A. Electrode 130 is clamped between P_r cover 170 and lower shoulder 164 of P_r body 160 as shown in FIG. 1A. Aperture 132 (shown in FIG. 2C) in electrode 130 permits fluid to freely flow through electrode 130 between the upper surface of diaphragm 120 and pressure tube 172. Clamping electrode 130 to P_r body 160 holds conductor 134 in spaced relation to diaphragm 120. Electrode 130 is normally positioned so that the space between conductor 134 and diaphragm 120 is relatively small (e.g., on the order of 0.0002 meters).

Conductor 134 and diaphragm 120 form parallel plates of a capacitor 138. As is well known, C=Ae/d, where C is the capacitance between two parallel plates, A is the common area between the plates, e is a constant based on the material between the plates (e=1 for vacuum), and d is the distance between the plates. So, the capacitance provided by capacitor 138 is a function of the distance between diaphragm 120 and conductor 134. As diaphragm 120 flexes up and down, in response to changes in the pressure differential between chambers 110 and 112, the capacitance provided by capacitor 138 also changes. Because electrode 130 (and conductor 134) preferably remains stationary relative to the housing, electrode 130 may be referred to as the "reference electrode." At any instant in time, the capacitance provided by capacitor 138 is indicative of the instantaneous differential pressure between chambers 110 and 112. Known electrical circuits (e.g., a "tank" circuit characterized by a resonant frequency that is a function of the capacitance provided by capacitor 138) may be used to measure the capacitance provided by capacitor 138 and to provide an electrical signal representative of the differential pressure.

Transducer assembly 100 includes an electrically conductive feedthrough 180 to permit measurement of the capacitance provided by capacitor 138. One end 182 of feedthrough 180 contacts electrode 130. Feedthrough 180 extends through an aperture in P__r cover 170 so that the other end 184 of feedthrough 180 is external to transducer assembly 100. The aperture in P__r cover 170 through which feedthrough 180 extends is sealed, for example by a melted glass plug 185, to maintain the pressure in chamber 112 and to electrically insulate feedthrough 180 from P__r cover 170. Feedthrough 180 is electrically connected to conductor 134. Electrode 130 normally includes an electroplated through hole (not shown) to permit electrical connection between conductor 134 (on the bottom surface of electrode 130) and end 182 of feedthrough 180 which contacts the top surface of electrode 130. So, feedthrough 180 provides electrical connection to one plate of capacitor 138 (i.e., conductor 134). Since diaphragm 120 is welded to P__r body 160, P__r body 160 provides electrical connection to the other plate of capacitor 138 (i.e., diaphragm 120). So, the capacitance provided by capacitor 138 may be measured by electrically connecting a measuring circuit (not shown) between P__r body 160 and end 184 of feedthrough 180. In practice, the body of transducer assembly 100 is normally grounded, so the capacitance provided by capacitor 138 may be measured simply by electrically connecting the measuring circuit to end 184 of feedthrough 180.

Conductor 134 is normally disposed in a circular "ring-like" configuration on the lower surface of electrode 130 (as indicated in FIG. 2C). Further, some prior art pressure transducers include more than one conductor disposed on electrode 130 and a corresponding number of feedthroughs to electrically connect to the conductors. Such transducers provide at least two capacitors: a first capacitor formed by diaphragm 120 and one conductor on electrode 130 and a second capacitor formed by diaphragm 120 and another conductor on electrode 130. As is known, providing multiple capacitors in this fashion can be used to advantageously provide more accurate temperature compensation for the transducer.

In operation, transducer assembly 100 is normally used as an absolute pressure transducer. In this form, chamber 112 is normally first evacuated by applying a vacuum pump (not shown) to pressure tube 172. After chamber 112 has been evacuated, tube 172 is then sealed, or "pinched off" to maintain the vacuum in chamber 112. This creates a "reference" pressure in chamber 112. Although a vacuum is a convenient reference pressure, it is also known to use other pressures as the reference pressure. Since the pressure in chamber 112 is a known or reference pressure, the components used to construct chamber 112 (i.e., P__r body 160 and P__r cover 170) are referred to as P__r components (i.e., "reference pressure" components). After the reference pressure has been established in chamber 112, pressure tube 142 is then connected to a source of fluid (not shown) to permit measurement of the pressure of that fluid. Coupling pressure tube 142 in this fashion delivers the fluid, the pressure of which is to be measured, to chamber 110 (and to the lower surface of diaphragm 120). Since the pressure in chamber 110 is unknown, or is to be measured, the components used to construct chamber 110 (i.e., P__x cover 140 and P__x body 150) are referred to as P__x components (i.e., "unknown pressure" components). The center of diaphragm 120 flexes up or down in response to the differential pressure between chambers 110 and 112. Transducer assembly 100 permits measurement of the amount of flexure of the diaphragm and thereby permits measurement of the pressure in chamber 110 relative to the known pressure in chamber 112.

Transducer assembly 100 can of course also be used as a differential pressure transducer. In this form, pressure tube 142 is connected to a first source of fluid (not shown) and pressure tube 172 is connected to a second source of fluid (not shown). Transducer assembly 100 then permits measurement of the difference between the pressures of the two fluids.

One problem with transducer assembly 100 relates to the zero pressure differential nominal spacing between conductor 134 and diaphragm 120. The reference distance between diaphragm 120 and conductor 134 for a particular reference pressure differential between chambers 110 and 112, for example, the zero pressure differential, may be referred to as the "nominal distance" or "nominal gap." In operation of transducer assembly 100, diaphragm 120 of course flexes up and down, thereby changing the spacing between diaphragm 120 and conductor 134. However, for transducer assembly 100 to provide a consistently accurate pressure reading, it is important to provide a constant nominal distance between diaphragm 120 and conductor 134. So for a particular pressure differential, it is important to insure that the nominal distance between diaphragm 120 and conductor 134 is always the same. When manufacturing large numbers of transducer assemblies 100, it is important to consistently provide the same nominal distance between conductor 134 and diaphragm 120 in every unit. Further, in any one unit of transducer assembly 100, it is important to insure that the nominal distance remains constant and does not vary over time.

The nominal gap between the diaphragm and the electrode may be very small, e.g., in the range of 25 to 400 microns. The sensor may be made of a number of different materials, each of which may react differently in response to changes in temperature during manufacture or in use. Because the nominal gap and other tolerances are small, minor changes due to variations in temperature can have a significant effect on the nominal gap. For example, if the metallic housing expands in an axial direction (i.e., a direction perpendicular to the plane of the diaphragm) at a first rate, and the ceramic electrode 130 expands in the axial direction at a second rate, the nominal gap can change.

Prior art transducer assembly 100 includes a resilient element 192 for maintaining a constant nominal distance.

Resilient element 192 is squeezed between P_r cover 170 and the top of electrode 130. Lower shoulder 164 of P_r body 160 supports shoulder 136 of electrode 130. Since P_r cover 170 is welded to P_r body 160, resilient element 192 provides a spring force that pushes down on electrode 130 and holds electrode 130 in a fixed position relative to P_r body 160. Resilient element 192 is often implemented using a "wave washer" (i.e., a metallic O-ring type washer that has been bent in one or more places in directions perpendicular to the plane of the ring). Resilient element 192 provides a relatively large spring force (e.g., on the order of one hundred pounds) so as to hold electrode 130 in a stable position.

Although transducer assembly 100 holds electrode 130 securely, the nominal distance between conductor 134 and diaphragm 120 can vary by small amounts over time in response to, for example, mechanical or thermal shock. As those skilled in the art will appreciate, elements that are held in place by compression, such as electrode 130, can exhibit small amounts of movement (sometimes referred to as "creep") over time. This creep can sometimes change the nominal distance and thereby adversely affect the accuracy of transducer assembly 100. Overpressure conditions can also cause unwanted movement of electrode 130. During normal operation of transducer assembly 100, diaphragm 120 will never contact electrode 130. However, large pressures in chamber 110 beyond the normal operating range of transducer assembly 100 (i.e., overpressure), can cause diaphragm 120 to contact electrode 130 and slightly compress resilient element 192. When the overpressure condition dissipates and diaphragm 120 returns to a normal operating position, resilient element 192 re-expands and reseats electrode 130. Sometimes the new position of electrode 130 will be slightly different than the original position prior to the overpressure condition. Such shifts in position can cause changes in the nominal distance and adversely affect the accuracy of transducer assembly 100.

SUMMARY OF THE INVENTION

The invention provides improved electrodes and mountings for electrodes in pressure transducers. Generally, the electrode and mounting designs improve the stability of the electrode.

In one aspect of the invention a pressure transducer includes a hub-and-spoke mounting in one chamber. The hub-and-spoke configuration extends in a plane parallel to the diaphragm. The reference electrode is suspended from the hub of the hub-and-spoke mounting and positioned proximate to the diaphragm. The hub-and-spoke mounting improves the stability of the reference electrode and the uniformity of the nominal gap. The hub, and thus the reference electrode, remains substantially motionless as the body of the pressure transducer is subjected to various forces. One advantage is that the hub-and-spoke mounting isolates the electrode from the forces applied to the body of the pressure transducer, such as fluctuations in the atmospheric pressure. Additionally, the mounting eliminates the need for a resilient element to position the reference electrode. The mounting also improves the pressure transducer's response to overpressure conditions. The spokes may incorporate reentrant grooves to further improve the stability of the hub.

In another aspect of the present invention, a pressure transducer includes an improved reference electrode with a conductive support. The electrode is preferably entirely metallic. The electrode is rigidly affixed to an electrode mounting by a dielectric material. One advantage is that eliminating the ceramic from the electrode reduces the effect of stray capacitances. A second advantage is that the transducer will be more thermally stable because the electrode will have a thermal coefficient of expansion similar to that of the housing. Also, the dielectric joint will be more reliable than mechanical fasteners and maintain a fixed position of the electrode over time. Preferably, a spacer may set the nominal gap between the electrode and the diaphragm. In preferred embodiments, the electrode is a dual electrode, with a dielectric insulating a first electrode from a second electrode.

In another aspect of the invention, the transducer has an electrode with a disk portion mounted to a support post that provides mechanical support and is held to the housing with a joining material, such as glass, metallic solder or braze, ceramic, or glass-ceramic. The support post is preferably made of ceramic and may be a rod formed as a separate piece from the electrode, or a post portion that is formed as part of a unitary and monolithic disk and post. The joint between the post and the housing forms a compression type joint with very high strength. The material at this joint preferably has low stiffness, and one advantage, therefore, is that the joint is able to absorb some thermal expansion mismatch. The joint is able to relieve strain between the housing and the post at the joint in an elastic and predictable manner when the pressure transducer is subjected to temperature change. Also, another advantage is that the ceramic post, having a very high stiffness, further rejects thermally induced strains from reaching the disk. In yet another aspect of the invention, a ceramic electrode includes a groove in one face of the disk portion. The groove also relieves stress between the post portion and the disk portion caused by thermal expansion due to temperature variations.

In another aspect of the invention, a pressure transducer includes a member having a low thermal coefficient of expansion (TCE) relative to the housing. The housing is preferably metallic and supports a ceramic reference electrode by means of a ceramic rod joined to the electrode. The low TCE member is connected to the housing proximate to where the rod of the reference electrode is joined to the housing. The low TCE member helps prevent warping of the housing due to thermal effects when the pressure transducer is subjected to temperature variations during manufacture or use. The low TCE member may be rigidly connected in or opposite to an opening in the housing in which the rod is held. Alternatively, the housing may include a hub-and-spoke or similar mounting, and the low TCE member may be welded to the spokes on a side facing away from the electrode and the diaphragm.

Still other objects and advantages of the present invention will become readily apparent to those skilled in the art from the following detailed description wherein the invention is shown and described by way of illustration of embodiments of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE FIGURES

For a fuller understanding of the nature and objects of the present invention, reference should be made to the following detailed description taken in connection with the accompanying drawings in which the same reference numerals indicate the same or similar parts and in which dimensions are shown only by way of example, wherein:

FIG. 2A shows a top view of the P__x body shown in FIGS. 1A–1B;

FIG. 2B shows a top view of the P__r body shown in FIGS. 1A–1B;

FIG. 2C shows a bottom view of the electrode shown in FIGS. 1A–B;

DETAILED DESCRIPTION OF THE PREFERRED EMBODIMENTS

Figure 3B:
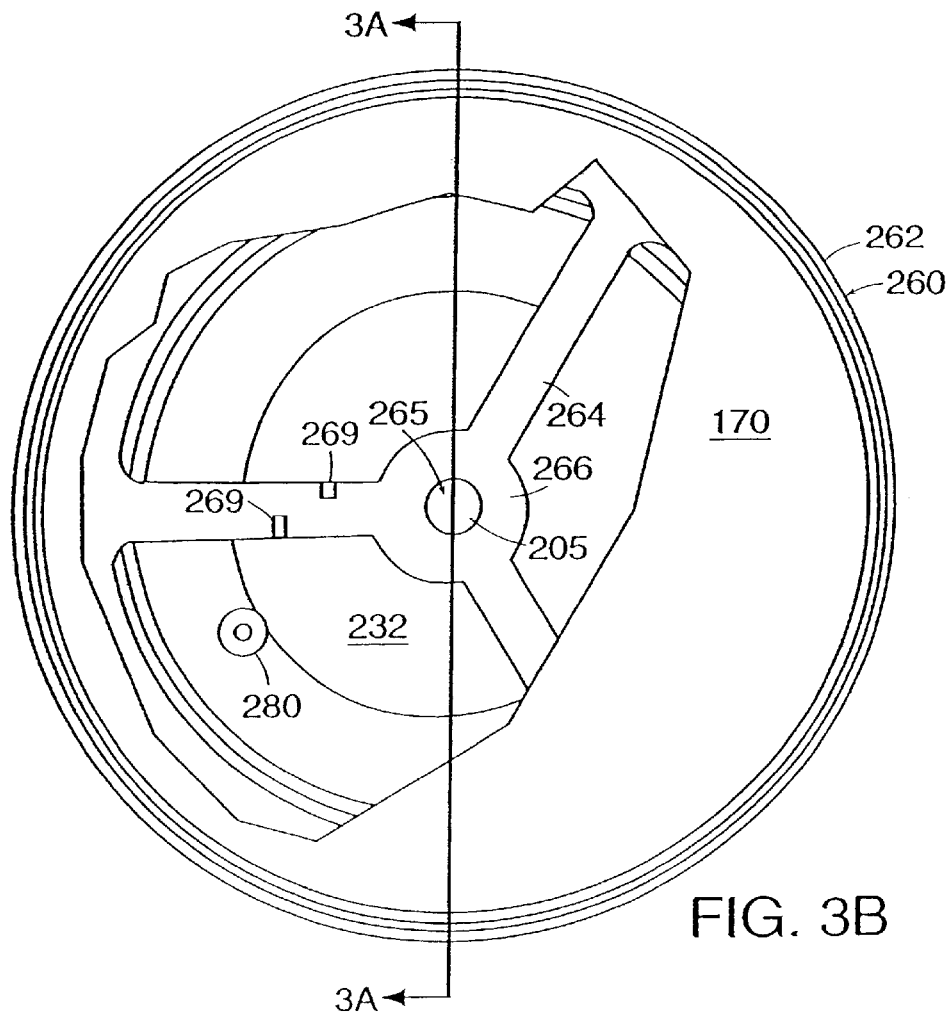
FIG. 3B shows a partially broken away top view of the assembly shown in FIG. 3A.
Figure 3A:
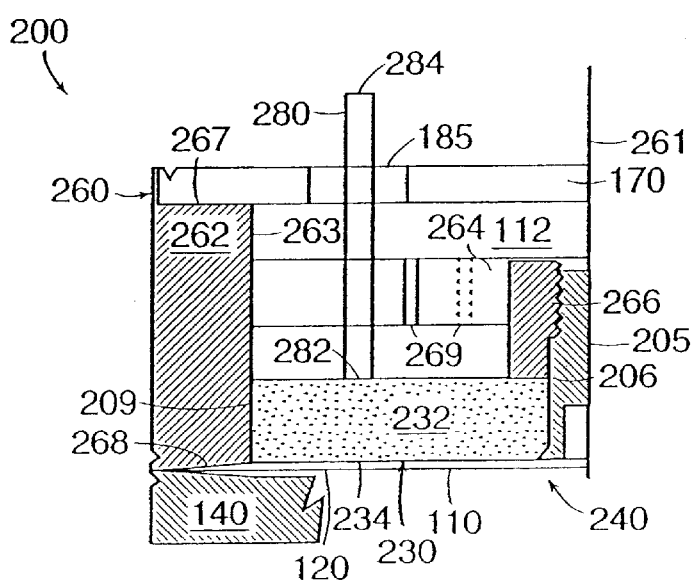
FIG. 3A shows a partially sectional side view of a capacitive pressure transducer assembly constructed according to the present invention.
Figure 3C:
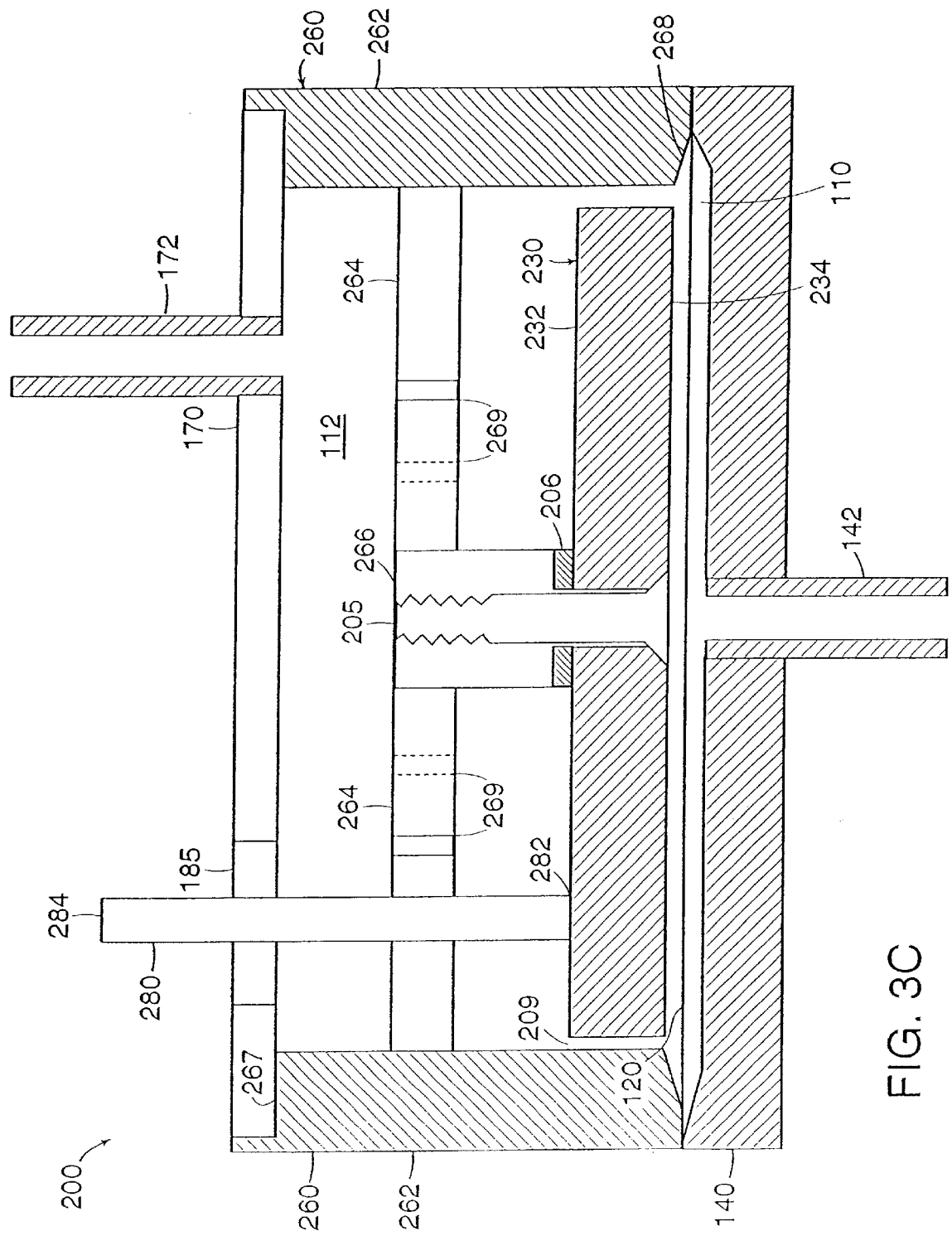
FIG. 3C shows a sectional side view of a capacitive pressure transducer constructed according to the present invention.

FIG. 3A shows a partially sectional side view of an assembled transducer assembly 200 constructed according to the present invention. FIG. 3B shows a partially broken away top view of the transducer assembly shown in FIG. 3A. FIG. 3C shows a sectional side view of transducer assembly 200. In the preferred embodiment, some components used to construct transducer assembly 200 are the same, or similar to, components used in prior art transducer assembly 100. More specifically, transducer assembly 200 includes P__x cover 140, diaphragm 120, and P__r cover 170 components that are similar to those used in prior art transducer assembly 100. However, rather than the P__r body 160 and electrode 130 components used in prior art assembly 100, assembly 200 includes an improved P__r body 260 and an improved electrode 230. Assembly 200 eliminates the need for resilient element 192.

Figure 4B:
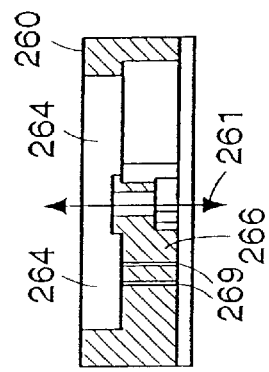
FIGS. 4A and 4B show top and perspective views, respectively, of a preferred embodiment of the improved P__r body used in the assembly shown in FIGS. 3A–3C.
Figure 4D:
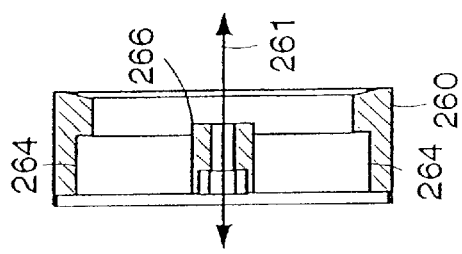
FIGS. 4C and 4D show sectional views of the P__r body shown in FIG. 4A taken along lines 4C—4C and 4D—4D, respectively, as shown in FIG. 4A.
Figure 4A:
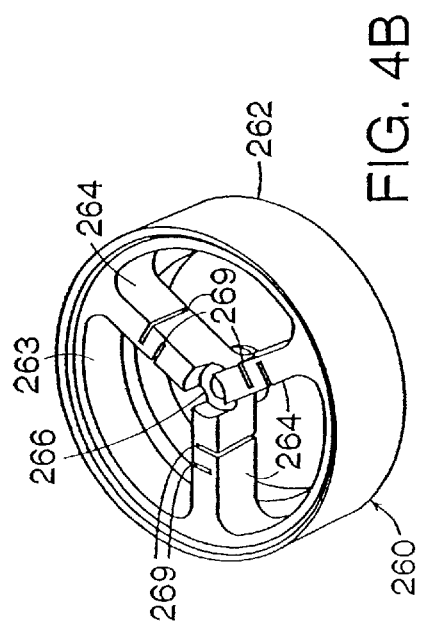
Figure 4C:
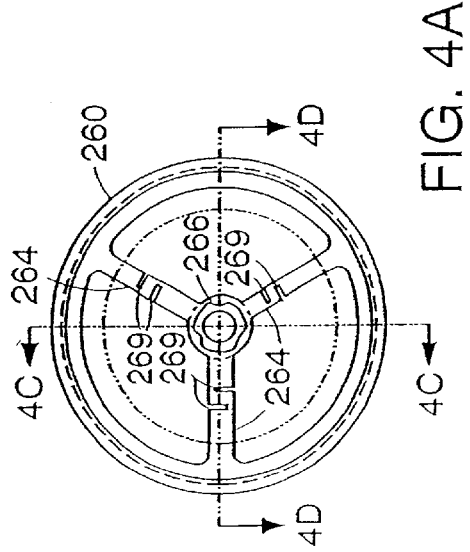

FIGS. 4A and 4B show top and perspective views, respectively, of a preferred embodiment of improved P__r body 260. FIG. 4C shows a sectional view of P__r body 260 taken along line 4C—4C as shown in FIG. 4A, and FIG. 4D shows a sectional view of P__r body 260 taken along line 4D—4D as shown in FIG. 4A. As shown in FIGS. 4A–4D, P__r body 260 includes an outer tubular case or shell 262, one or more spokes 264, and a central hub 266. Tubular case 262 extends along a central axis 261 as shown in FIGS. 4C and 4D. Case 262 includes an interior surface 263 which defines an interior cavity or aperture within P__r body 260. In preferred embodiments, spokes 264 extend from interior surface 263 in a direction substantially perpendicular to axis 261 towards the center of case 262. In other embodiments spokes 264 can extend from interior surface 263 in directions other than perpendicular to axis 261 towards the center of case 262. Spokes 264 support central hub 266, and central axis 261 intersects central hub 266. One end of each spoke 264 contacts the interior surface 263 of case 262, and the other end of each spoke 264 contacts and supports central hub 266. As will be discussed in greater detail below, one advantage of P__r body 260 is that central hub 266 tends to remain substantially stationary, or motionless, with respect to case 262.

Referring again to FIGS. 3A–3C, it can be seen that the upper surface of case 262 is preferably stepped and defines a shoulder 267 for supporting P__r cover 170. In the preferred embodiment, P__r cover 170 is welded to shoulder 267 to form an air-tight seal between P__r cover 170 and the top of case 262. Case 262 also defines a lower surface 268. In the preferred embodiment, diaphragm 120 is welded to lower surface 268 to form an air-tight seal between diaphragm 120 and the bottom of case 262. P__r cover 170, P__r body 260, and diaphragm 120 thereby cooperate to define interior sealed chamber 112 (as in prior art assembly 100, pressure tube 172 can be sealed to provide a desired reference pressure in chamber 112).

Figure 1A:
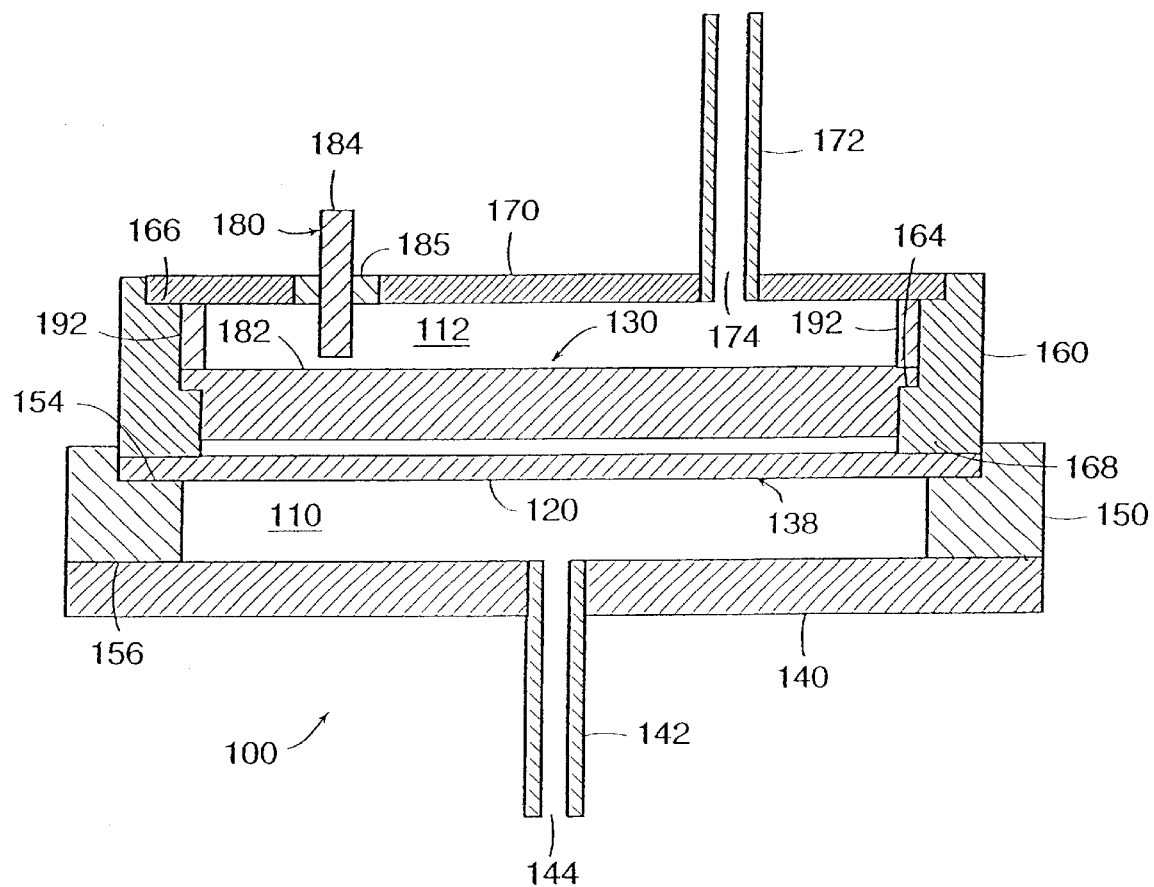
FIG. 1A shows a partially sectional side view of a prior art assembled transducer assembly.
Figure 1B:
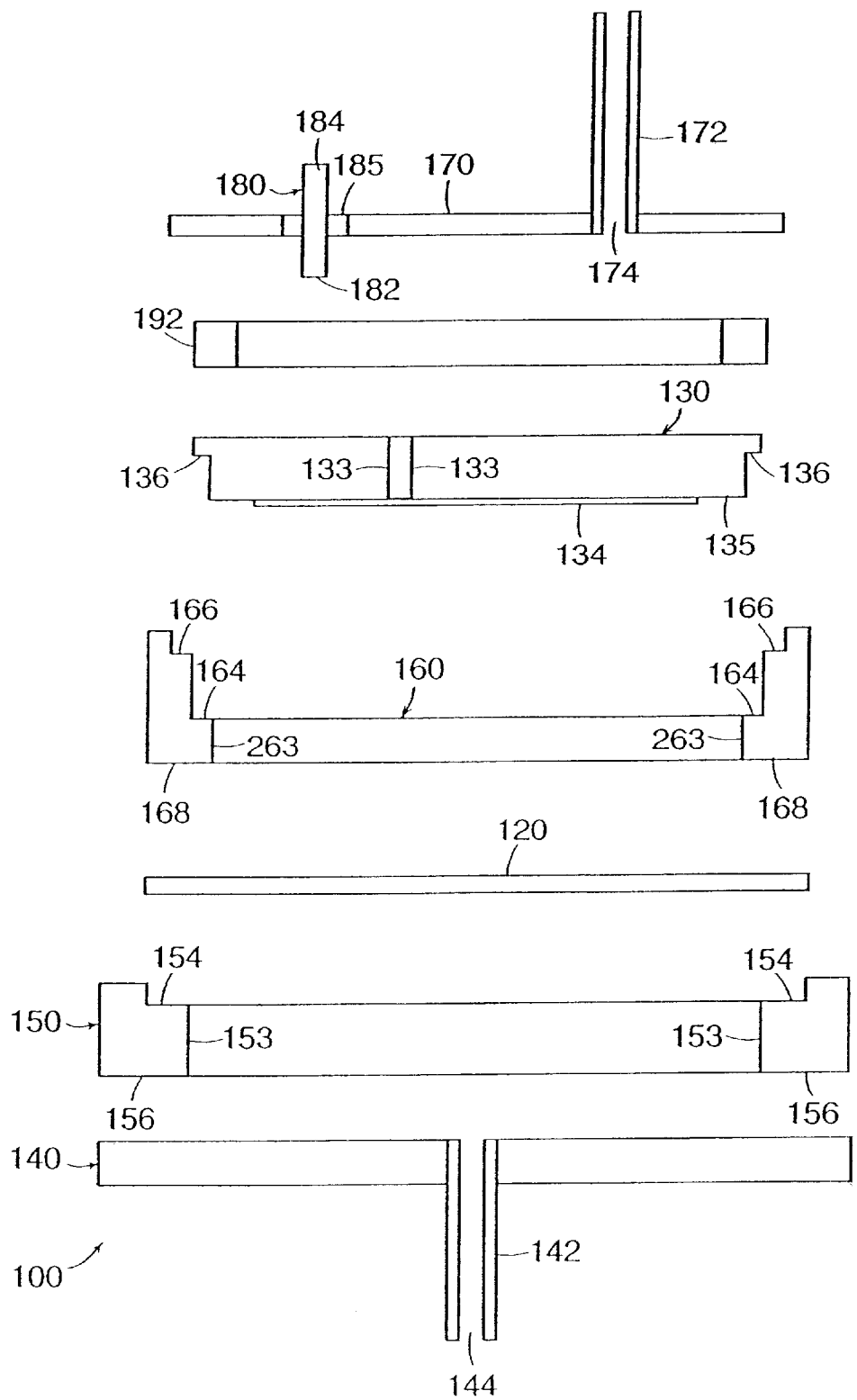
FIG. 1B shows an exploded sectional side view of the assembly shown in FIG. 1A.

An upper surface of P__x cover 140 is preferably fixed (e.g., welded) to diaphragm 120 so that P__x cover 140 and diaphragm 120 cooperate to define interior chamber 110 (on the opposite side of diaphragm 120 from chamber 112). Although FIGS. 1A and 1B show the chamber 110 as being formed by P__x cover 140, P__x body 150, and diaphragm 120, assembly 200 eliminates the need for, and forms chamber 110 without, P__x body 150. In other embodiments, assembly 200 can include P__x body 150 and can form chamber 110 in the same or similar fashion as illustrated in FIGS. 1A and 1B. However, in the preferred embodiment of assembly 200, P__x body 150 is eliminated. Those skilled in the art will appreciate that the P__x cover 140 shown in FIG. 3A is similar to, but not exactly the same as, the P__x cover 140 shown in FIG. 1A. More specifically, the upper surface of the P__x cover 140 shown in FIG. 3A is sloped, or beveled (rather than flat as shown in FIG. 1A), so that chamber 110 is formed between the P__x cover 140 and diaphragm 120 when the diaphragm 120 is fixed (e.g., welded) to the outer perimeter of the upper surface of P__x cover 140. Those skilled in the art will appreciate that the differences between the P__x covers 140 illustrated in FIGS. 1A and 3A, as well as the manner in which chamber 110 is formed, are not critical to the present invention.

Figure 5A:
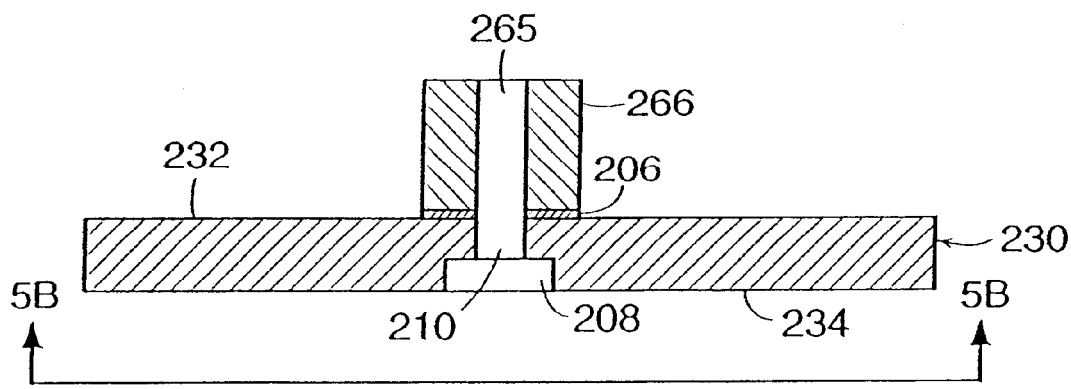
FIGS. 5A and 5B show sectional side and bottom views, respectively, of a preferred embodiment of the electrode shown in FIGS. 3A–3B.
Figure 5B:
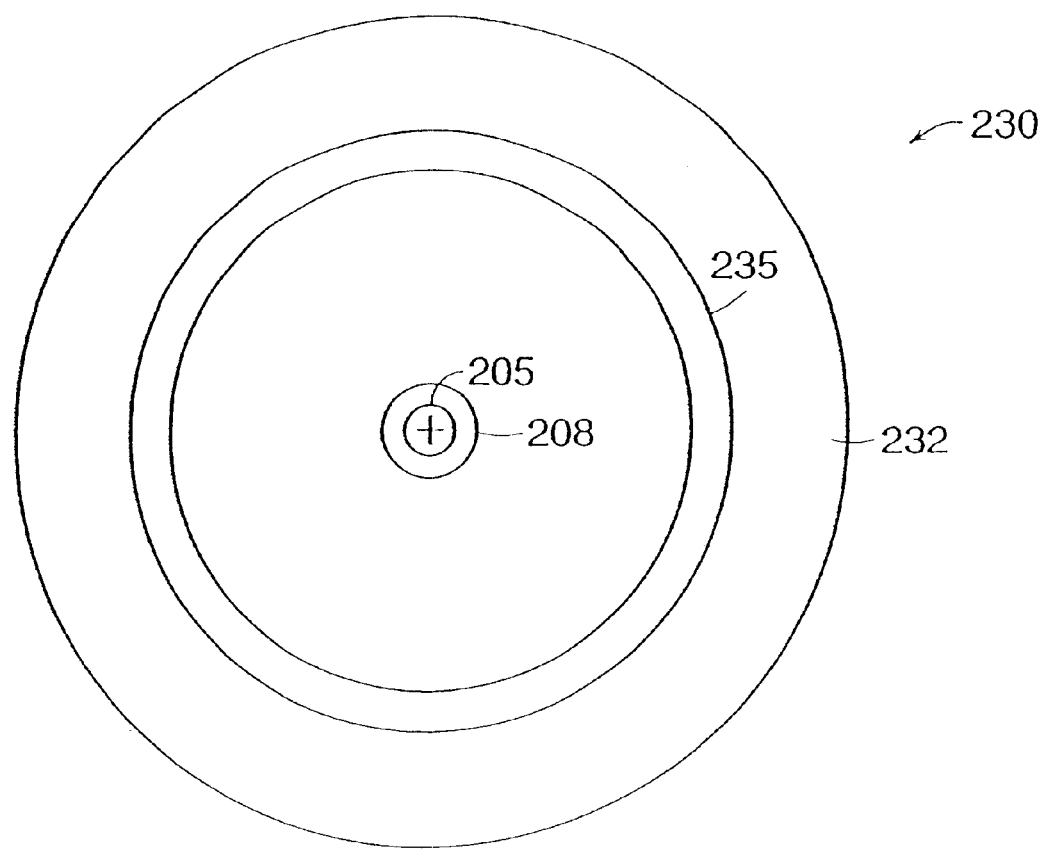

Central hub 266 defines a central aperture 265 (shown in FIG. 3B), which is preferably configured (e.g., threaded) to receive a screw 205 or other type of fastener. Screw 205 or other fastener holds electrode 230 to central hub 266 of the P__r body 260. FIG. 5A shows a sectional side view of a preferred embodiment of electrode 230 mounted to central hub 266. FIG. 5B shows a view of electrode 230 taken along line 5B—5B of FIG. 5A. Electrode 230 includes a block 232 of electrically insulative material (preferably ceramic), which may for example be cylindrical or disc shaped, and one or more conductors 235 (shown in FIG. 5B) disposed in conventional fashion on the lower surface 234 of block 232. In this embodiment, insulative block 232 defines a central aperture 210 configured to match the central aperture 265 of central hub 266. As shown in FIGS. 3A and 3C, screw 205 holds hub 266 and insulative block 232 together. Insulative block 232 also preferably defines a depression 208 (as shown in FIG. 5A) that is wider than, and that connects to, bore hole 210 to permit countersinking or counterboring of screw 205. It is desirable to provide for countersinking or counterboring of screw 205 in this manner to prevent any portion of screw 205 from entering the space between electrical conductor 235 and diaphragm 120. In other embodiments, a rivet or adhesive may be used in place of screw 205. In yet another embodiment, one end of screw (or bolt) 205 extends through aperture 265 and a nut (not shown) is threaded onto that end and cooperates with screw 205 to hold hub 266 and insulative block 232 together. In this embodiment, central aperture 265 may or may not be threaded.

When electrode 230 is fixed to central hub 266 (e.g., by screw 205), the lower surface 234 of insulator 232 is placed in spaced relation to the diaphragm 120 (as shown in FIGS. 3A and 3C) so that diaphragm 120 and the one or more conductors 235 (shown in FIG. 5B) form one or more capacitors 240. One or more spacers 206 may be disposed between the top of insulative block 232 and the bottom of central hub 266 to adjust the spacing between the conductor 235 and the diaphragm 120. The spacers 206 are preferably configured as "ring" type washers defining a central aperture to permit passage of screw 205. In preferred embodiments, spacers 206 are between 0.004 and 0.007 inches thick, are made from stainless steel and are used in quantities of two or less.

A conductor 235 may be disposed as a relatively thin ring as shown in FIG. 5B. Alternatively, one or more other types of conductors may be disposed on the lower surface 234 of insulative block 232 so that the capacitor formed by each conductor and diaphragm 120 is indicative of the distance between diaphragm 120 and the conductor.

In preferred embodiments of transducer assembly 200, insulative block 232 is mounted by fixing only a central portion of insulative block 232 to hub 266. The outer perimeter of insulative block 232 spaced apart from, and is not in contact with, case 262 of P__r body 260 so that a gap 209 (as shown in FIGS. 3A and 3C) is provided between case 262 and insulative block 232. This stands in contrast with prior art transducer assembly 100 wherein the entire outer perimeter of ceramic electrode 130 was supported by P__r body (and resilient element 192). As will be discussed in greater detail below, this improves the stability of electrode 230.

Spokes 264, central hub 266, and electrode 230 are all disposed in interior chamber 112. However, these components do not interfere with the communication of fluid pressure between diaphragm 120 and P__r cover 170. As stated above, electrode 230 is mounted to central hub 266 and gap 209 (shown in FIG. 3C) is provided between case 262 and electrode 230. Gap 209 permits fluid to flow around electrode 230 and thereby eliminates the need for aperture 132 (shown in FIG. 2C) of prior art electrode 130. Electrode 230 is therefore simpler and less expensive to construct than prior art electrode 130. Spokes 264 also do not interfere with fluid flow within chamber 112 since large apertures exist between adjacent spokes (i.e., since a discrete number of spokes, rather than a continuous circular planar sheet, are used to support central hub 266, the support for central hub 266 does not interfere with fluid flow within chamber 112).

Transducer assembly 200 includes an electrically conductive feedthrough 280 for electrically connecting to conductor 235. One end 282 of feedthrough 280 contacts the upper surface of insulative block 232. Feedthrough 280 extends through the space between the spokes (as shown in FIG. 3B) and through an aperture in P__r cover 170. The other end 284 of feedthrough 280 is external to transducer assembly 200. As with prior art transducer assembly 100, the aperture in P_r cover 170 through which feedthrough 280 extends is sealed (e.g., with glass plug 185) to maintain pressure in chamber 112 and to electrically insulate feedthrough 280 from P_r cover 170. The lower end 282 of feedthrough 280 is electrically connected in conventional fashion to conductor 235 (e.g., through an electroplated aperture extending through or around the edge of insulative block 232 from end 282 to conductor 235). Feedthrough 280 is electrically connected to one plate (i.e., conductor 235) of capacitor 240, and P_r body 260 is electrically connected to the other plate (i.e., diaphragm 120) of capacitor 240. An additional feedthrough is preferably provided for each additional conductor disposed on surface 234 of insulative block 232. Feedthrough 280 preferably contacts electrode 230 without providing structural support to electrode 230. Rather, the structural support for electrode 230 is provided by central hub 266 of the P_r body 260.

As stated above, one advantage of P_r body 260 is that central hub 266 tends to remain substantially stationary, or motionless, with respect to case 262. That is, spokes 264 provide a stable mounting for central hub 266. Since central hub 266 remains substantially stationary, or motionless, with respect to case 262, electrode 230 remains substantially stationary with respect to a nominal position of diaphragm 120. Assembly 200 thereby advantageously provides a substantially constant nominal distance between electrode 230 and diaphragm 120.

One reason that central hub 266 remains substantially stationary with respect to case 262 relates to the elimination, or reduction, of spring forces in assembly 200. As stated above, prior art transducer assembly 100 used the spring force resulting from compressing resilient element 192 to maintain the position of electrode 130. The electrode 130 of prior art assembly 100 was therefore subject to "creep" or motion over time. Rather than such resilient elements, improved transducer assembly 200 uses spokes 264 to fix the position of central hub 266 so that hub 266 forms a stable mounting platform. Assembly 200 then uses a fastener such as screw 205 (or a rivet, or an adhesive, or a welded bond, or other type of fastener) to securely hold electrode 230 to the stable mounting platform of central hub 266. Electrode 230 remains stationary because of the stable, stationary, nature of central hub 266.

Spokes 264 are preferably formed from solid members. In a nominal state (e.g., at a nominal operating temperature of assembly 200), spokes 264 are preferably not under any tension or compression. Whereas prior art assembly 100 is characterized by a relatively large amount of stored, or potential, energy (resulting from the compression of resilient element 192), the amount of stored energy in improved transducer assembly 200 is at or very near zero. The absence, or reduction, of stored energy in assembly 200 tends to make all components of assembly 200, including central hub 266 and electrode 230, remain substantially stationary and stable over time.

Figure 6A:
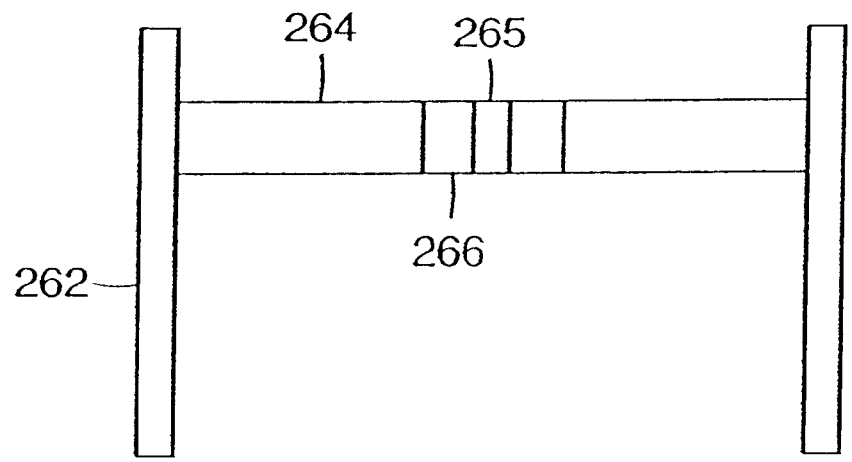
FIG. 6A shows a sectional side view of a P__r body, the spokes of which do not include reentrant grooves, in a nominal operating position.
Figure 6B:
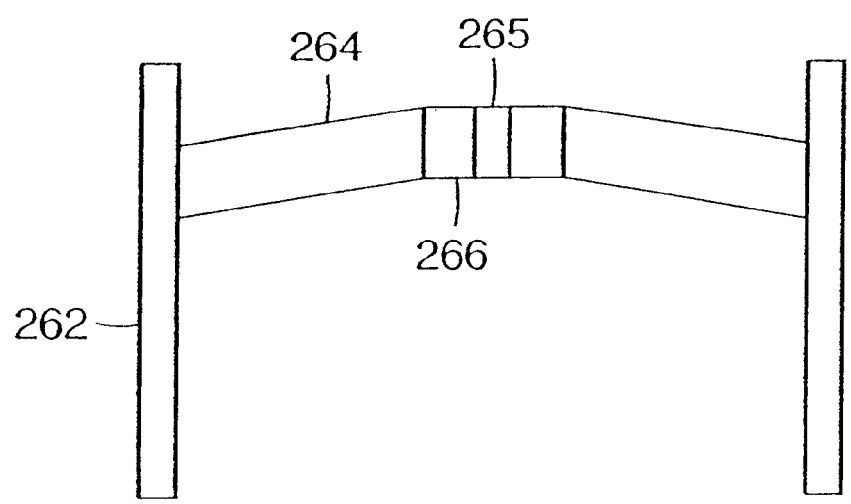
FIG. 6B shows a sectional side view of the P__r body shown in FIG. 6A after the application of heat.

Although central hub 266 tends to remain stationary during nominal operating conditions of assembly 200, in some embodiments hub 266 may experience some movement when assembly 200 experiences mechanical or thermal shock or stress. For example, heating or cooling assembly 200 causes thermal expansion or contraction of spokes 264. Such thermal expansion or contraction can place each of the spokes under compression or tension and the compressive or tensile forces on the spokes 264 may cause some displacement of central hub 266. FIG. 6A shows a sectional side view of a P_r body 260 showing casing 262, spokes 264, and central hub 266 all in a nominal operating position. FIG. 6B shows a sectional side view of the P_r body 260 shown in FIG. 6A after application of heat. The heat caused thermal expansion of spokes 264 which in turn caused an upward displacement (or bowing) of central hub 266.

To reduce such displacements caused by thermal or mechanical shock or stress, in the preferred embodiment of assembly 200, spokes 264 include reentrant grooves 269. In the embodiment illustrated in FIGS. 4A, 4B, and 4D, each of the spokes 264 include two reentrant grooves 269. In FIG. 3B, one of the spokes 264 is shown as including two reentrant grooves. For convenience of illustration, two of the spokes 264 in FIG. 3B are shown as not including any reentrant grooves, however, those skilled in the art will appreciate that each of these spokes preferably does include reentrant grooves. The reentrant grooves 269 permit the spokes 264 to maintain the stable position of central hub 266 even when the spokes 264 are under compression or tension. That is, the reentrant grooves 269 permit each of the spokes 264 to deform when the spokes 264 are exposed to compression or tension. Each spoke 264 is preferably provided with matching or complementary reentrant grooves 269 (i.e., the reentrant grooves in one spoke match the reentrant grooves in another spoke). Since all spokes 264 are provided with complementary reentrant grooves 269, the deformation in one spoke matches, or complements, the deformation experienced by the other spokes 264. The complementary deformation experienced by all of the spokes 264 causes the central hub 266 to remain stable in the nominal operating position even in the presence of thermal or mechanical shock or stress.

In the embodiment illustrated in FIGS. 4A, 4B, and 4D, each of the spokes 264 is provided with two complimentary rectangular reentrant grooves 269. Those skilled in the art will appreciate that in other embodiments other types of reentrant grooves may be used. For example, the shape of the reentrant grooves is not critical, and rather than being rectangular they could be characterized by other shapes and be for example semi-circular or triangular. Further, rather than two reentrant grooves per spoke, other numbers of grooves may be provided. In the preferred embodiment, each spoke includes at least two reentrant grooves. Those skilled in the art will appreciate that finite element analysis may be used to calculate other patterns of reentrant grooves that may be used with the invention.

Figure 7B:
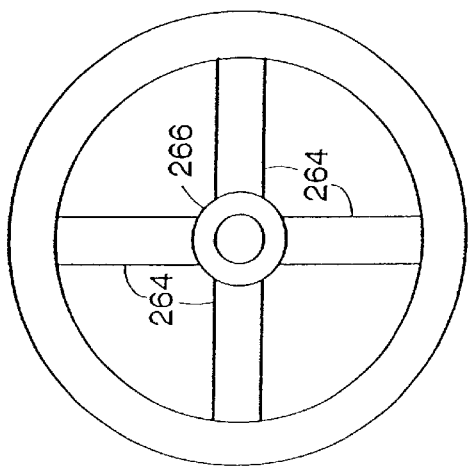
FIGS. 7A, 7B, 7C and 7D show top views of alternative embodiments of a P__r body constructed according to the invention.
Figure 7D:
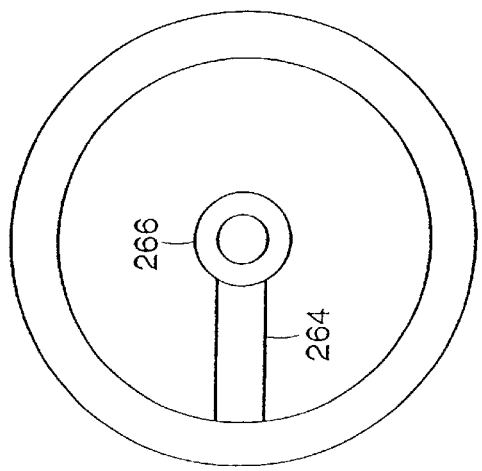
Figure 7A:
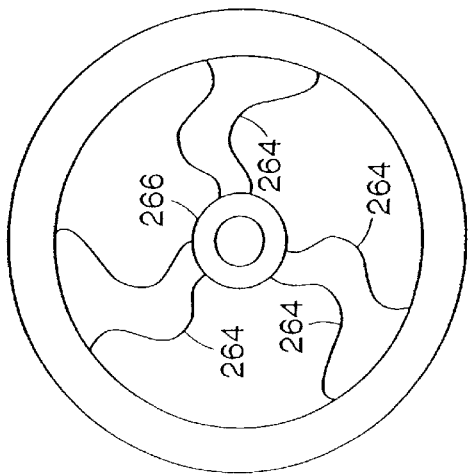
Figure 7C:
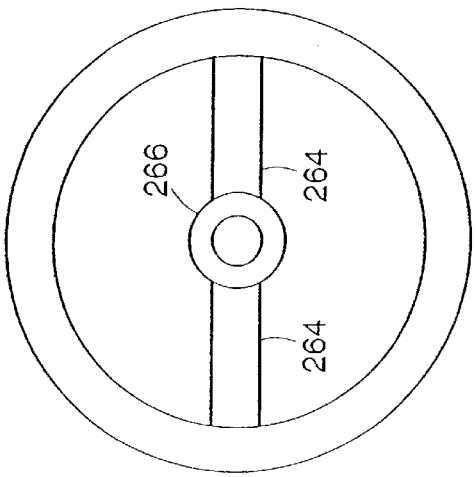

The preferred embodiment of P_r body 260 illustrated in FIGS. 4A–4D includes three spokes 264. Each of the spokes is straight and extends in a direction substantially perpendicular to the central axis 261 of P_r body 260. However, those skilled in the art will appreciate that other patterns of spokes may be used with the invention. FIGS. 7A, 7B, 7C, and 7D illustrate alternate configurations of the spokes 264. FIG. 7A shows a three-spoke configuration where each of the spokes 264 is curved rather than straight. FIGS. 7B, 7C, and 7D show four, two, and one spoke configurations. P_r body 260 preferably includes two or more spokes 264, however, the one spoke embodiment (one example of which is illustrated in FIG. 7D) is also embraced within the invention. In all of the configurations illustrated in FIGS. 7A, 7B, and 7C, each of the spokes is preferably provided with reentrant grooves (not shown).

In addition to providing improved stability in the presence of thermal or mechanical shock or stress, the spoke design of P_r body 260 also provides improved stability in the presence of overpressure conditions. For example, referring to FIGS. 3A–3C, an overpressure condition can cause diaphragm 120 to contact and displace electrode 230. Spokes 264 elastically flex upwards to permit such a displacement of electrode 230. However, when the overpressure condition dissipates, the spokes 264 tend to return to their original operating position and thereby return electrode 230 to its desired nominal operating position. With or without reentrant grooves, the spoke design of P__r body 260 provides an improved performance in the presence of overpressure conditions. Whereas the resilient element 192 of prior art assembly 100 could cause a reseating (or shifting) of electrode 130 following an overpressure condition, the spokes 264 of P__r body 260 tend to always return electrode 230 to its original desired nominal operating position following overpressure conditions.

P__r body 260 (including case 262, spokes 264, and central hub 266) is preferably of a monolithic (i.e., single piece) metallic construction. One preferred method of manufacturing P__r body is by extrusion. While monolithic construction is preferred, those skilled in the art will appreciate that P__r body 260 could alternatively be formed from separate parts.

In preferred embodiments, P__x cover 140, P__r body 260, P__r cover 170, hub 266, spokes 264, and spacer 206 are all fabricated from the same metal (e.g., Inconel®, a nickel, iron, and chromium alloy). Insulative block 232 is preferably fabricated from alumina or Fosterite (i.e., Magnesium Silicate).

1. Metal Electrode

Figure 8B:
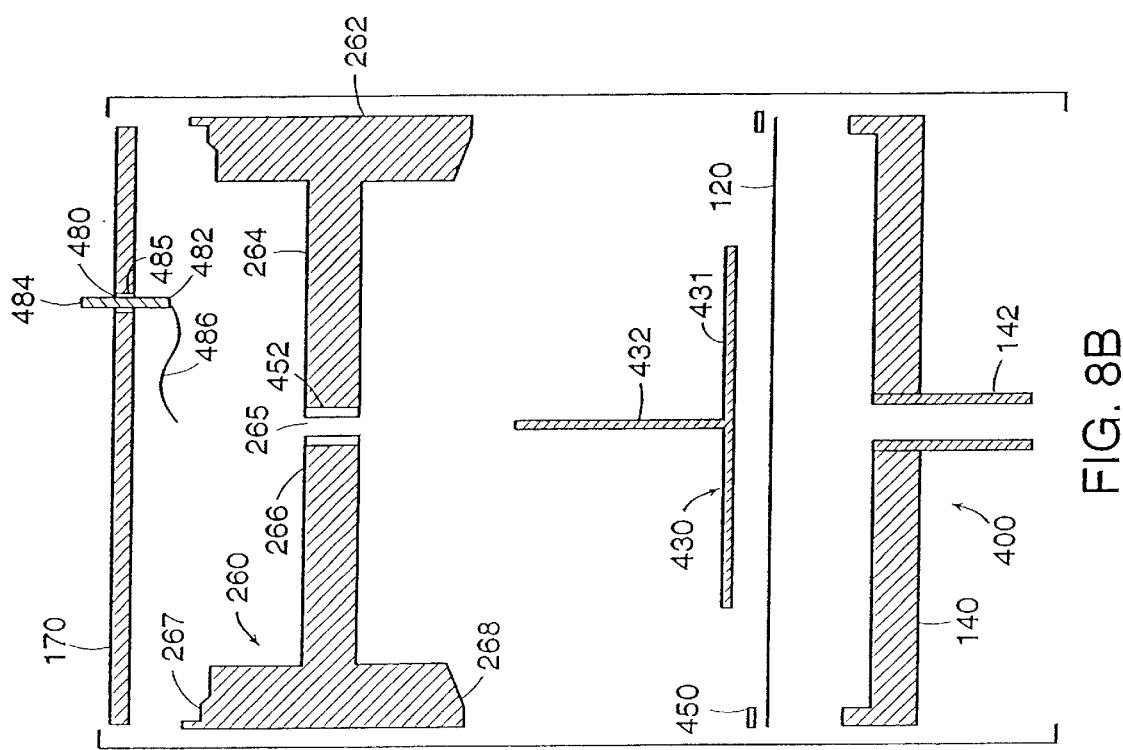
FIG. 8B shows an exploded view of the capacitive pressure transducer assembly shown in FIG. 8A.
Figure 8A:
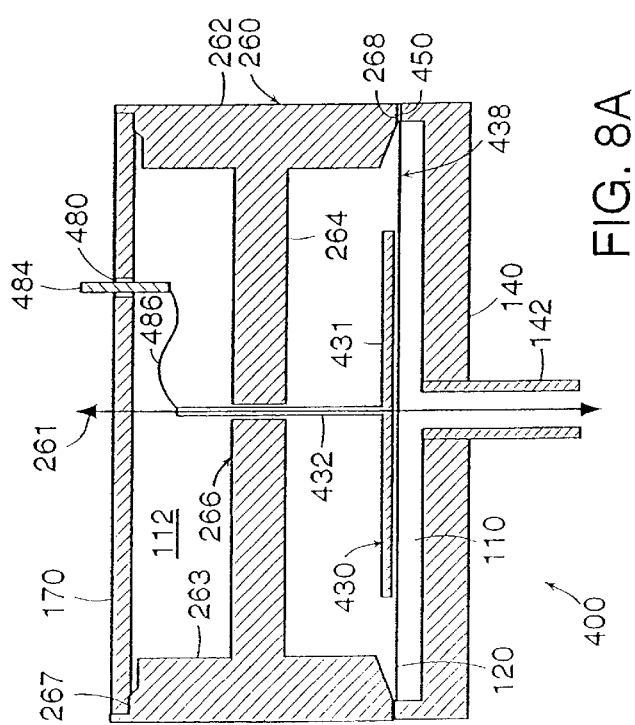
FIG. 8A shows a sectional side view of a capacitive pressure transducer assembly constructed according to an alternative embodiment of the present invention.
Figure 9:
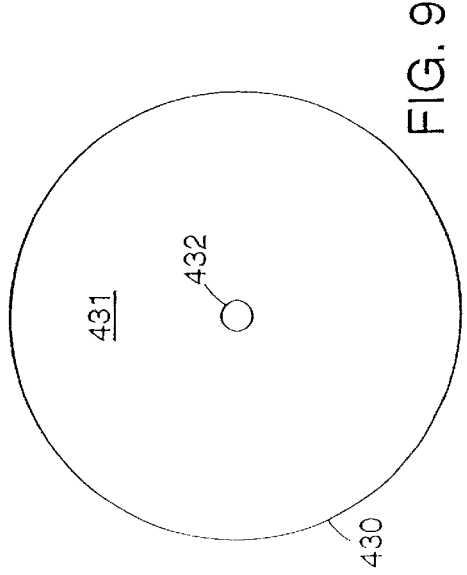
FIG. 9 shows a top view of an electrode constructed according to a preferred embodiment of the present invention.

FIG. 8A shows a partially sectional side view of another capacitive pressure transducer assembly 400 constructed according to the invention. FIG. 8B shows an exploded view of assembly 400. As with assembly 200 (shown, e.g., in FIGS. 3A, 3B, and 3C), assembly 400 includes P__r body 260, P__r cover 170, P__x cover 140, and diaphragm 120. Assembly 400 also includes an electrode that is supported by the hub 266 of P__r body 260. However, rather than using electrode 230, assembly 400 includes a different type of electrode 430. FIG. 9 shows a top view of electrode 430. Electrode 430 is entirely metallic (i.e., unlike electrodes 130 or 230, electrode 430 does not include an insulative, or ceramic, portion). Electrode 430 includes a disk-shaped conductive plate 431 and a cylindrically-shaped conductive support rod 432. Rod 432 is joined to plate 431 so that electrode 430 is characterized by an inverted T-shape as shown in FIGS. 8A and 8B. Rod 432 can be welded or otherwise affixed to plate 431, or alternatively, rod 432 and plate 431 can be formed as a single monolithic metallic construction. Electrode 430 is mounted in assembly 400 so that rod 431 extends through the central aperture 265 defined by hub 266. An insulative dielectric material 452, for example, glass, is used to hold rod 432 fixed relative to hub 266.

Assembly 400 has several advantages. First, eliminating the ceramic from the electrode improves the performance of assembly 400 by reducing the effect of stray capacitances. In prior art electrodes, such as electrode 130 (shown in FIG. 1A), in which a conductive plate is disposed on an insulative ceramic disk, the presence of the ceramic tends to create relatively large stray capacitances between the metal housing parts and the conductive plate that undesirably affect the capacitance measured between the diaphragm and the conductive plate. That is, because of its high dielectric constant, the ceramic causes a "magnifying effect" that tends to make the surrounding metal housing and the conductive plate seem to be closer together than they actually are so that the stray capacitances are relatively large. These stray capacitances decrease the sensitivity of the pressure transducer. Eliminating the ceramic from the electrode eliminates this "magnifying effect" and thereby allows assembly 400 to more accurately measure the distance between the diaphragm and the conductive plate 431.

Second, eliminating ceramic from the electrode improves the thermal stability of transducer assembly 400. The coefficients of thermal expansion for ceramic and metal are not equal. Therefore, heating prior art assembly 100 causes the P__r body to expand faster in the vertical direction (as well as all other directions) than does the ceramic of electrode 130. So, heating assembly 100 causes an increase in the distance between the conductor 134 and the diaphragm 120. Since the distance between the diaphragm 120 and the conductor 134 of assembly 100 can change in response to temperature changes, the assembly 100 is not thermally stable (i.e., ideally, the distance between diaphragm 120 and the electrode changes only in response to the pressure differential between chambers 110 and 112). In contrast to assembly 100, in assembly 400, the electrode 430 does not include any ceramic and is entirely metallic. This allows the coefficient of thermal expansion of the electrode 430 to match the coefficient of thermal expansion for P__r body 260 and thereby improves the thermal stability of assembly 400 (i.e., the distance between diaphragm 120 and the lower surface of plate 431 does not tend to change in response to changes in temperature). In preferred embodiments, the P__r body 260 and the electrode 430 are both fabricated from the same material (e.g., Inconel).

Third, dielectric plug 452 holds electrode 430 more reliably than can mechanical screws or other mechanical fasteners. Whereas screws and other mechanical fasteners can loosen, shift or otherwise change over time, dielectric plug 452 tends to remain stable and unchanging for extremely long periods of time and thereby holds electrode 430 in a very fixed position relative to hub 266. In some embodiments, the hub 266 of assembly 400 may be threaded to accommodate a screw-type fastener. However, such threads are unnecessary in assembly 400.

Fourth, since electrode 430 is fixed to assembly 400 at a location that is internal to assembly 400 (i.e., at the hub 266), the dielectric plug 452 need not form an air tight seal. This stands in contrast to prior art assemblies (e.g., as described in U.S. Pat. No. 5,442,962) in which the dielectric material that fastens the electrode to the assembly also forms an airtight seal between the external environment and the interior chambers of the assembly. In such prior art assemblies, the need for forming an airtight seal generally drives the selection of the dielectric material and glass sealing alloys are normally used. Glass sealing alloys are disadvantageous because they (1) are limited in selection and thus in range of properties (such as the coefficient of thermal expansion); (2) are relatively expensive; and (3) can rust (because they include iron). Glass sealing alloys are also difficult to fuse. This characteristic makes it difficult to position the electrode accurately in prior art assemblies that use glass sealing alloys to hold the electrode and also increases the expense of their manufacture. Since dielectric plug 452 of assembly 400 need not form an air tight seal, the materials used to form plug 452 can be selected principally for their ease of use and their ability to hold the electrode 430 in a stable position, and this selection need not be compromised by the need to make the seal airtight. Preferred materials for forming dielectric plug 452 are specially doped glasses, such as those supplied by Northeast Electronics of Milford, Conn., or ceramics, such as those supplied by Ceramaseal, a division of CeramTec Corporation of New Lebanon, N.Y.

In addition to the P__r body 260, P__r cover 170, P__x cover 140, diaphragm 120, and electrode 430 discussed above, transducer assembly 400 additionally includes a spacer 450, a conductive feedthrough 480, a glass plug 485, and a conductive wire 486. Feedthrough 480 is a conductive pin that extends through an aperture defined in P__r cover 170. One end 484 of feedthrough 480 is external to assembly 400 and the other end 482 is internal to assembly 400. Glass plug 485 holds feedthrough 480 in place with respect to P__r cover 170 and electrically insulates feedthrough 480 from P__r cover 170. Conductive wire 486 physically connects to the upper end of rod 432 and to the internal end 482 of feedthrough 480, and thereby electrically connects feedthrough 480 to conductive plate 431. In alternative embodiments, conductive wire 486 may be replaced by a spring. So, external circuits can electrically connect to plate 431 (i.e., to measure the capacitance of the capacitor formed by diaphragm 120 and plate 431) by connecting to the external end 484 of feedthrough 480.

Unlike dielectric material 452 (which holds electrode 430 in place), glass plug 485 forms an air tight seal. However, since the feedthrough 480 does not need to be positioned with the high degree of accuracy required for electrode 430, it is relatively easy to form plug 485.

Spacer 450 has an annular shape and is disposed between the lower surface 268 of P__r body 260 and the upper surface of diaphragm 120. Spacer 450 is normally welded to the lower surface 268 of body 260 and to diaphragm 120. P__r cover 170, P__r body 260, spacer 450, and diaphragm 120 all cooperate to define the sealed interior chamber 112. P__x cover 140 and diaphragm 120 cooperate to define the interior chamber 110.

Conductive plate 431 and diaphragm 120 together form the sensor capacitor 438. The lower surface of conductive plate 431 is preferably disposed so that it is coplanar with the lower surface 268 of P__r body 260. When the lower surface of plate 431 and the lower surface 268 of P__r body 260 are coplanar, the nominal gap between the diaphragm 120 and the plate 431 is entirely determined by the thickness of the spacer 450. Preferred values for the thickness of spacer 450 are between about 0.001 inches to about 0.020 inches. Preferred materials for forming spacer 450 are, for example, Invar®, Kovar®, and Inconel®.

One preferred method for attaching the electrode 430 to the P__r body 260 is to (1) place the lower surface of plate 431 onto a planar surface (e.g., a flat table); (2) place the lower surface 268 of P__r body 260 onto the same planar surface so that the rod 432 extends through, and is centered within, the hub 266; and (3) form the dielectric plug 452 while the electrode 430 and the P__r body 260 are so positioned. The dielectric plug 452 may be formed by placing dielectric material between the hub 266 and the rod 432, heating the assembly to melt the dielectric material, and then allowing the dielectric material to cool and solidify.

As shown in FIGS. 8A and 8B, spokes 264 extend from an interior surface 263 of the tubular case or sidewall 262 of P__r body 260. The interior surface 263 from which spokes 264 extend is preferably vertical, that is parallel to central axis 261. Both the interior 263 and exterior surfaces of the case 262 are preferably substantially vertical, that is, parallel to the central axis 261. Generally, barometric pressure effects are greatest on poorly supported portions of the capacitive pressure transducer housing, such as the P__r cover 170, and are magnified in transducers operating at very low pressures. In prior art assemblies in which the electrode is fixed to a relatively thin, horizontal cover (as described for example in the above-referenced U.S. Pat. No. 5,442,962), changes in barometric pressure may undesirably alter the nominal gap between the diaphragm and the electrode. The vertical case 262 of P__r body 260 of assembly 400 is preferably relatively thick (e.g., 0.25 inches), and is further supported by the spokes 264, and is therefore very rugged, sturdy, and relatively immune to changes in barometric pressure (i.e., it does not flex or bend appreciably in response to changes in barometric pressure). Accordingly, the P__r body 260 of assembly 400 isolates the electrode 430 from barometric pressure effects on the exterior of the capacitive pressure transducer. Because the hub 266 to which electrode 430 is mounted is interior to the housing and is preferably affixed to a vertical portion of the housing, which is stronger than the P__r cover 170 and less susceptible to barometric pressure variations, electrode 430 is isolated from external pressure changes, and the stability of the assembly 400 is enhanced. To enhance stability even further, the capacitive pressure transducer 400 may also incorporate reentrant grooves in spokes 264 of the type 269 described above with respect to assembly 200 (e.g., as shown in FIG. 4B). In alternative embodiments, electrode 430 could be suspended from variations of the hub-and-spoke type electrode mounting. For example, the electrode mounting could be any electrode mounting extending from P__r case 262 into the center of chamber 112 and defining an aperture in which improved electrode 430 is joined to the mounting with a plug of insulative material.

Figure 10B:
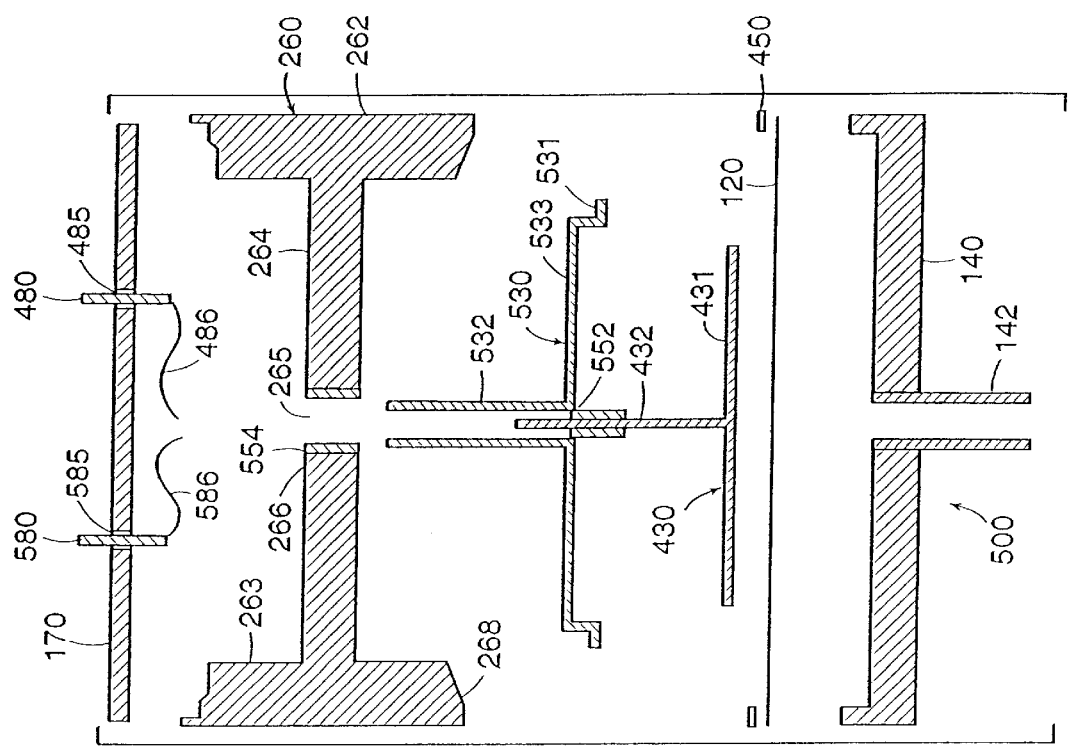
FIG. 10B shows an exploded view of the capacitive pressure transducer assembly shown in FIG. 10A.
Figure 10A:
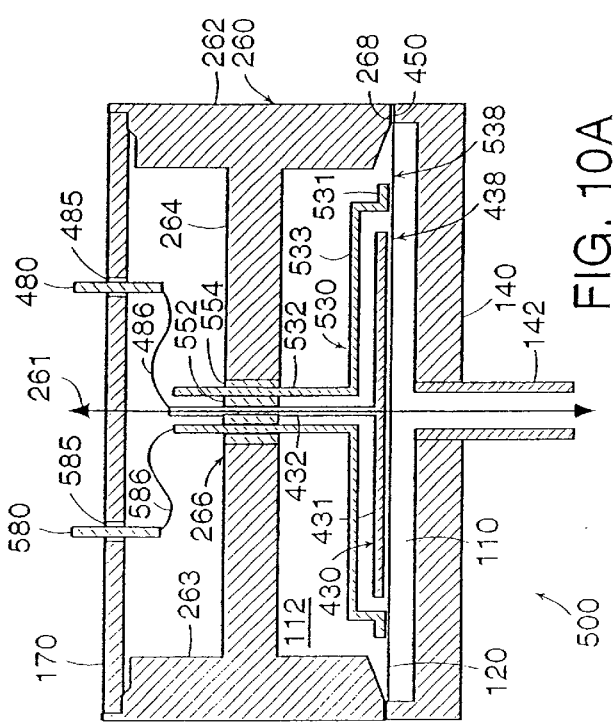
FIG. 10A shows a sectional side view of a capacitive pressure transducer assembly constructed according to an alternative embodiment of the present invention, having a dual electrode.
Figure 11:
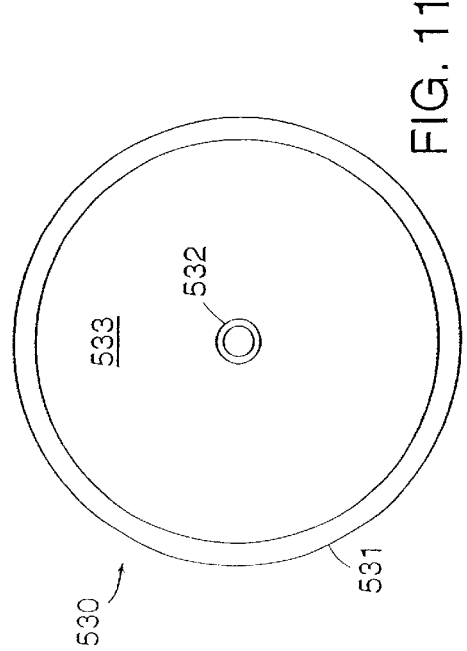
FIG. 11 shows a top view of an outer electrode constructed according to a preferred embodiment of the present invention.

FIGS. 10A and 10B show sectional side and exploded views, respectively, of another embodiment of a capacitive pressure transducer assembly 500 constructed in accordance with the present invention. Assembly 500 is very similar to assembly 400. However, instead of including only a single electrode 430 (as in the case of assembly 400), assembly 500 includes two electrodes: first electrode 430 and a second electrode 530. First electrode 430 and second electrode 530 are preferably arranged as and inner electrode and an outer electrode, respectively, as shown in FIGS. 10A and 10B. FIG. 11 shows a top view of second electrode 530.

Second electrode 530 includes an annular, planar conductive plate 531, a conductive cup-shaped horizontal support 533, and a conductive tubular support 532. As with electrode 430, second electrode 530 is preferably entirely metallic. Plate 531, horizontal support 533, and tubular support 532 may be all formed as a single conductive monolithic construction, or alternatively, these components may be formed separately and welded or otherwise joined together.

In assembly 500, second electrode 530 surrounds first electrode 430. The lower surface of second electrode conductive plate 531 is coplanar with and surrounds the lower surface of first electrode conductive plate 431. Tubular support 532 surrounds and extends coaxially with first electrode support 432 along axis 261. Like rod 432, tubular support 532 extends through the central aperture 265 of hub 266.

In addition to the second electrode, assembly 500 also includes two supports of dielectric material 552, 554 a second conductive feedthrough 580, a second glass plug 585, and a second conductive wire 586. The second feedthrough 580 extends through a second aperture in P__r cover 170. The second glass plug 585 holds feedthrough 580 with respect to cover 170 and also electrically insulates feedthrough 580 from cover 170. Wire 586 electrically connects the upper end of tubular support 532 to the end of feedthrough 580 that is internal to assembly 500. Dielectric material 554 fastens tubular support 532 to hub 266 and also electrically insulates electrode 530 from hub 266. Dielectric material 552 fastens support rod 432 to the interior of tubular support 532 and also electrically insulates first electrode 430 from second electrode 530. As with dielectric material 452 of assembly 400, dielectric materials 552 and 554 need not form airtight seals. A preferred method for joining electrode 430 and electrode 530 to the hub 266 is to (1) place the lower surface of plate 431 onto a planar surface (e.g., a flat table); (2) place the lower surface of conductive plate 531 onto the same planar surface so that it surrounds plate 431 and so that rod 432 extends through tubular support 532; (3) place the lower surface of P__r body 260 onto the same planar surface so that rod 432 and tubular support 532 extend through, and are centered within, the hub 266; and (4) form the dielectric plugs 552 and 554 while the electrodes 430 and 530 are so positioned. The dielectric plugs 552 and 554 may be formed in a manner similar to plug 452 in assembly 400.

Diaphragm 120 and plate 431 form a first capacitor 438, and diaphragm 120 and plate 531 form a second capacitor 538. Assembly 500 thereby provides two capacitors that may be used to sense the difference in pressures in sealed internal chambers 110 and 112. The two capacitors are preferably balanced by making the area of annular plate 531 equal to the area of circular plate 431.

Figure 12A:
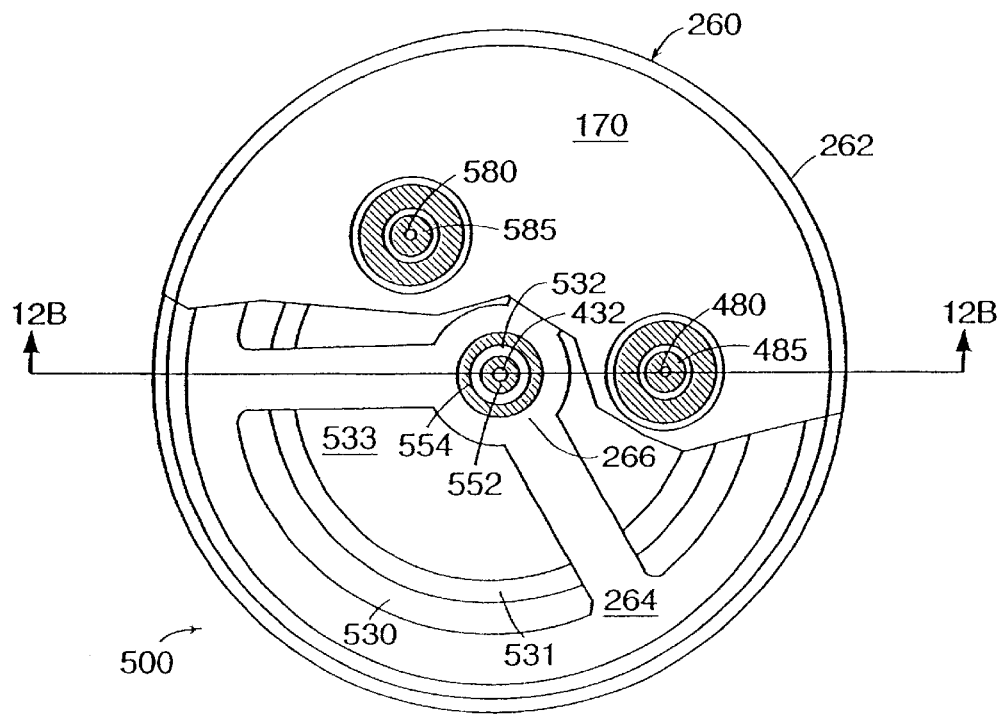
FIG. 12A shows a partially broken away top view of a capacitive pressure transducer constructed in accordance with an alternative embodiment of the present invention.
Figure 12B:
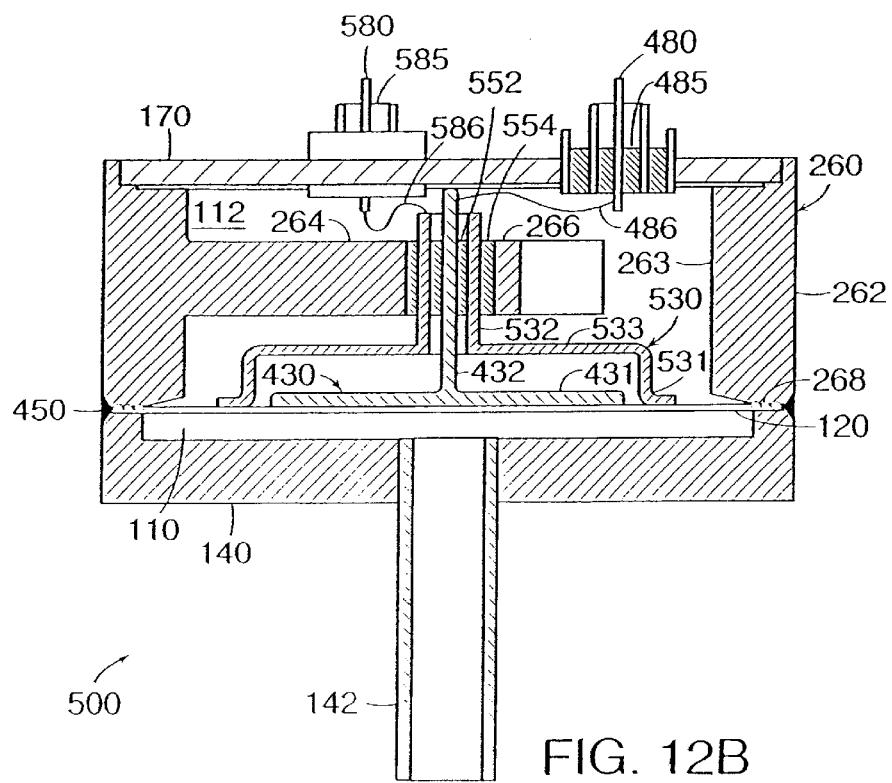
FIG. 12B shows a sectional side view of the capacitive pressure transducer assembly shown in FIG. 12A taken along the line 12B—12B.

FIGS. 12A and 12B show partially broken away top and sectional side views of an alternate embodiment of transducer assembly 500. In this illustrated embodiment, coaxial shielding is provided for each of the feedthroughs. Also, the second electrode 530 has a more rounded, less angular, configuration. That is, the junction between conductive plate 531 and the cup-shaped horizontal support 533 is rounded rather than angular.

Figure 13A:
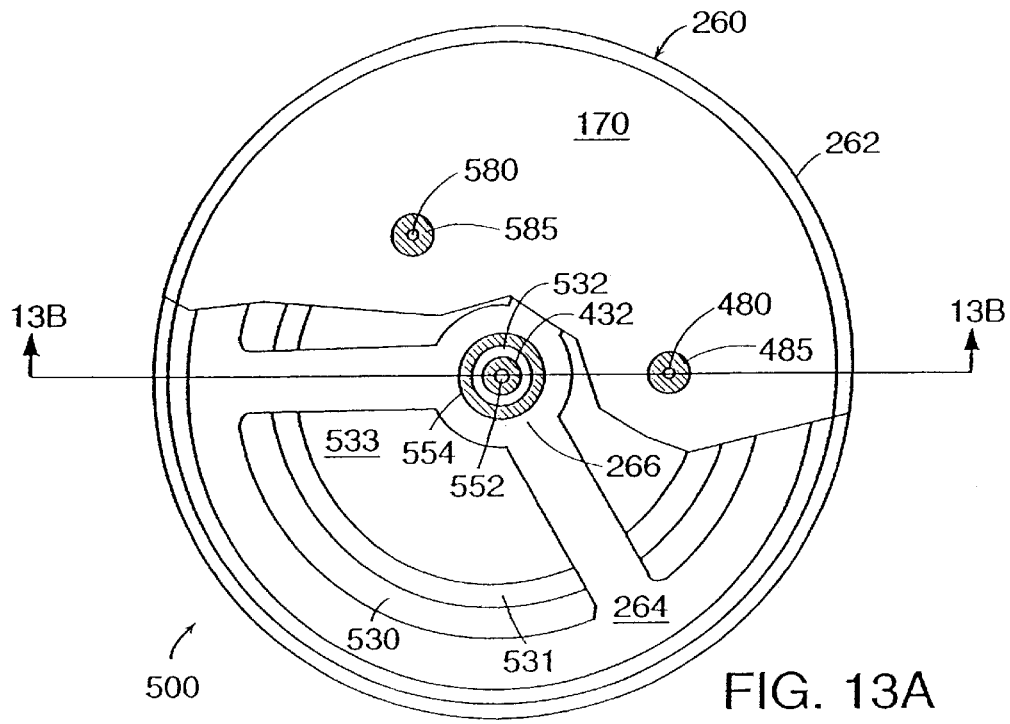
FIG. 13A shows a partially broken away top view of a capacitive pressure transducer constructed in accordance with an alternative embodiment of the present invention.
Figure 13B:
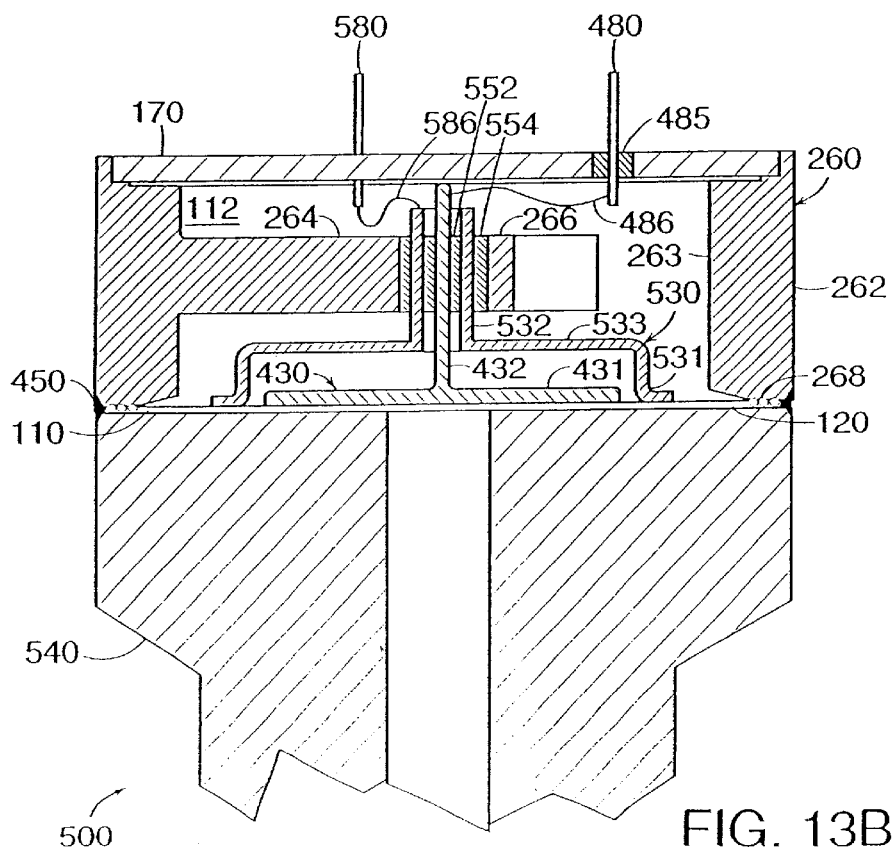
FIG. 13B shows a sectional side view of the capacitive pressure transducer assembly shown in FIG. 13A taken along the line 13B—13B.

FIGS. 13A and 13B show partially broken away top and sectional side views, respectively, of yet another alternate embodiment of transducer assembly 500. Rather than P__x cover 140, this embodiment includes a P__x body 540, which is substantially thicker and more rugged than P__x cover 140. This illustrated embodiment is particularly suitable for providing a miniaturized transducer. For example, in this embodiment, the diameter of P__r body 260 may be made smaller than 1.00 inches in diameter.

2. Ceramic Electrode with Elastic Joint and Groove

Figure 14:
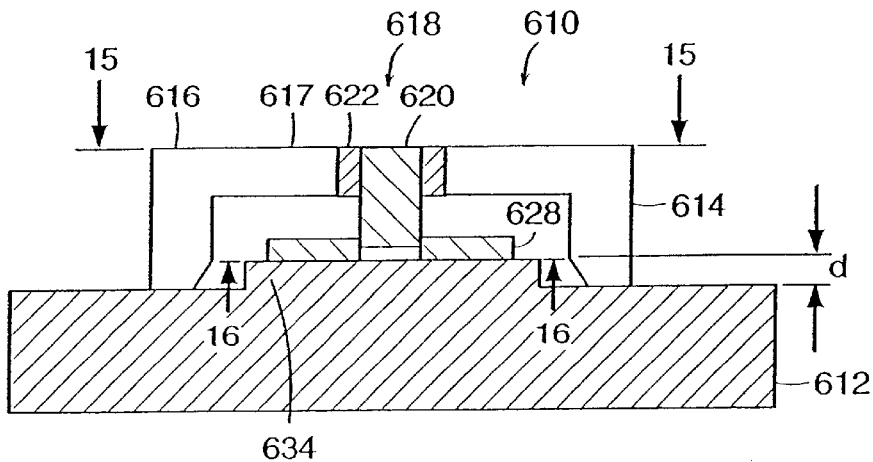
FIG. 14 is a part side, part cross-sectional, view of a capacitive pressure transducer shown in a fixture used for manufacturing a pressure transducer in accordance with another embodiment of the present invention.
Figure 15:
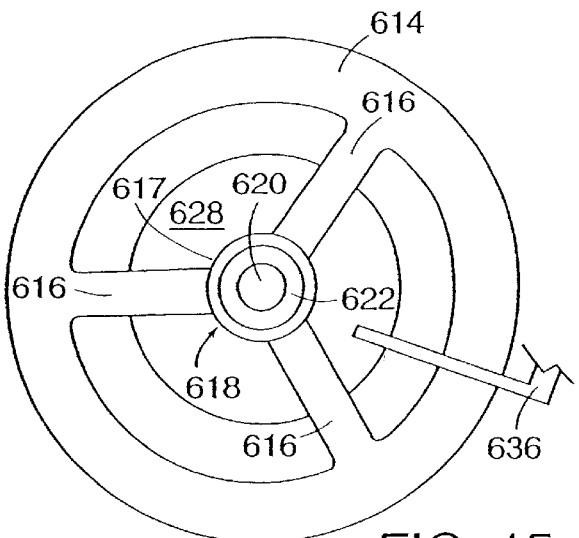
FIGS. 15 and 16 are views taken along the lines 15—15 and 16—16, respectively, of FIG. 14.

FIG. 14 shows a portion 610 of another pressure sensor constructed according to another aspect of the invention, shown on a fixture 612 used to manufacture the device. As also shown in FIG. 15, in some embodiments, a housing portion 614 is preferably configured as a hub 617 with a number of spokes 616 (e.g., as described in U.S. Pat. No. 5,965,821). The hub has an opening 618 which holds a support rod 620 held in the hub 617 with a joint 622. The joint 622 can be made of a vitreous or devitrifying glass, such as a lead borosilicate, or it could be a metallic braze or solder, ceramic, or glass-ceramic. Rod 620 is preferably made of ceramic, such as alumina 96% or manganese silicate (Forsterite); and housing portion 614 is preferably made of metal, such as Inconel, which is a nickel, chromium, and iron alloy.

Figure 16:
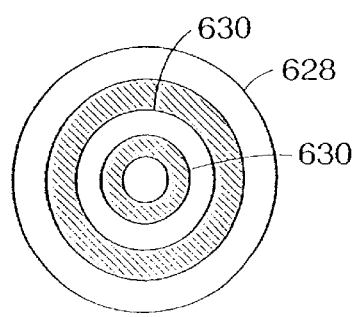

At the other end of rod 620 is an electrode 628 that is made from a ceramic disk with one or more conductors 630, such as metal films, formed on the lower surface of the disk. The electrode 628 may be a separate piece that is joined to the rod 620 to form a unit with a substantially T-shaped cross-section. As shown in more detail in FIG. 16, the electrode 628 preferably has two concentric conductive rings 630 formed on the lower surface of the disk, opposite to where the disk is joined to the rod, and facing where the diaphragm 640 will be (see FIG. 17).

The manufacturing fixture 612 shown in FIG. 14 helps to set and maintain a distance d between conductors 630 on electrode 628 and a diaphragm 640 when the diaphragm 640 is welded or otherwise joined to housing portion 614. Fixture 612 has a surface with a raised portion 634 that defines the distance d between the electrode 628 and the diaphragm 640. The distance may be quite small, e.g., 25 to 400 microns. Electrode 628 and rod 620 with joint 622 are placed in the housing 614 with the electrode resting on fixture 612. The joining material is then melted and cooled in order to join rod 620 within the opening 618 to insure that the lower surfaces of housing portion 614 of electrode 628 are spaced apart by the desired distance d. This is turn insures that the lower surface of electrode 628 will be spaced apart from the diaphragm 640 by the distance d, or a related distance d' after the assembly has cooled, in the assembled transducer. During temperature change to the sensor 600 during manufacture or use, a glass joint 622, provides an elastic joint between the rod 620 and the housing 614 and, together with the high stiffness of the rod 620, helps prevent strains resulting from the changes in temperature from reaching the electrode 628 from the housing 614.

Rod 620 is rigidly held in opening 618 to provide mechanical support to electrode 628, but it need not provide an electrical connection, i.e., rod 620 need not be conductive (although it could be). An electrical connection to conductor 630 is preferably provided through an additional lead 636 provided between spokes 616.

Figure 17:
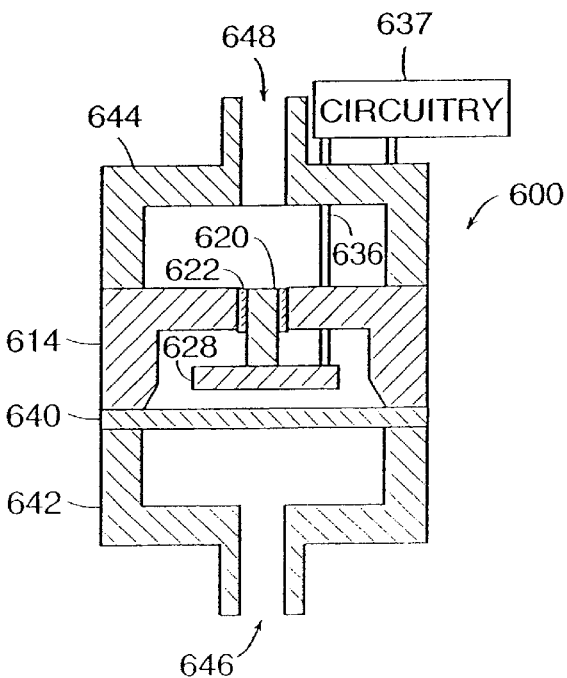
FIG. 17 is a cross-sectional view of a capacitive pressure transducer constructed according to an embodiment of the present invention.

Referring to FIG. 17, showing a pressure sensor 600 in a more finished form, a diaphragm 640 is welded to housing portion 614, a second housing member 642 is welded on the other side of the diaphragm 640, and another housing member 644 may be welded over the top of housing portion 614 shown in FIG. 14 to define a device housing. Alternatively, housing portion 614 and member 644 may be integrally formed. Housing member 644 also has an opening 648 to establish a reference pressure. Opening 646 allows a fluid to enter the sensing chamber and cause the diaphragm 640 to move relative to electrode 628.

Circuitry 637 provides a signal to diaphragm 640 and electrode 628; e.g., circuitry 637 may include a tank circuit characterized by a resonant frequency, the frequency being a function of the capacitance between electrode 628 and diaphragm 640. The capacitance changes in response to the change in the pressure from opening 646 relative to the pressure on the other side of diaphragm 640 as diaphragm 640 moves. Typically, a non-zero signal is provided to the electrode, and the housing and diaphragm are grounded.

Figure 18A:
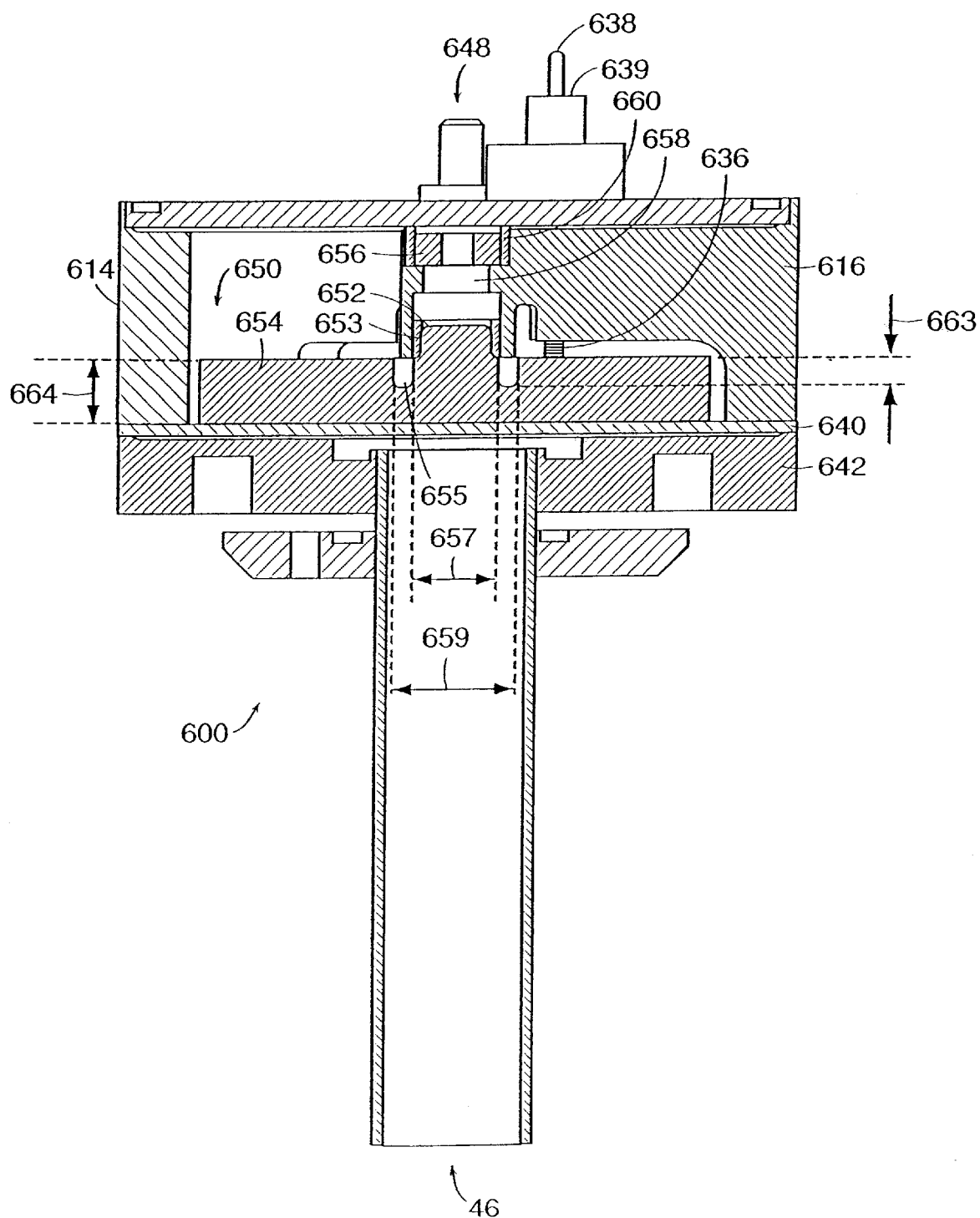
FIG. 18A is a cross-sectional view of a capacitive pressure transducer constructed according to another embodiment of the present invention.

Referring to FIG. 18A, an electrode disk and a support post can be made as a single monolithic T-shaped piece 650, with a post portion 652 and a disk portion 654, rather than as two separate pieces. Post portion 652 is rigidly joined to housing 616 with a joint 653 that may be glass, metal, or ceramic. If glass, joint 653 may be made from vitreous or devitrifying glass that bonds to ceramic, such as lead borosilicate glass. Where the post portion 652 and disk portion 654 come together, a substantially circular groove 655 is formed in the upper surface of disk portion 654 around the base of post portion 652. The groove is defined by an inside diameter 657, an outside diameter 659, and a depth 663. The width of the groove is defined by the difference between the outside diameter 659 and the inside diameter 657. The inside diameter 657 of the groove 655 is about equal to the diameter of post portion 652 where the post portion 652 joins the disk portion 654. The groove 655 preferably has a depth 663 approximately equal to one-half the thickness 664 of the disk portion 654. This groove 655 serves to relieve strain at the joint and to keep disk portion 654 flat.

As discussed above, temperature variations generally adversely affect the accuracy of the sensor. This is particularly true when the housing is metallic and the electrode (and/or electrode support) is ceramic, and have substantially different coefficients of expansion. The size of the gap in the sensing capacitor will be a function of both the pressure being sensed and the temperature to which the device is subjected. A dual electrode design employs the principle of "planar rejection" to filter out temperature effects in sensing the unknown pressure. In a dual electrode design, typically, the measured capacitance is the differential capacitance between the first and second capacitors. In accordance with the planar rejection concept, as long as both electrodes remain planar, the effect of any gap generated by temperature effects will be the same for both capacitors and will be canceled out in the differential measurement. Alternatively, the responses of the first and second capacitors to various temperature and pressure conditions can be measured and recorded beforehand. So long as the first and second electrodes in dual electrode design remain planar, these known characteristics may be used to correlate the measured capacitance of the first and second capacitors, to determine any effects of temperature on the signal, and to adjust for those effects to obtain an accurate pressure reading. Because the use of two planar electrodes in this way serves to compensate for or "reject" any temperature-related distortions, this design feature is referred to as "planar rejection." Although a dual electrode design is effective for planar rejection in the steady state (when relative differences are predictable and can be characterized beforehand), in a transient condition, the non-planar changes and combinations of effects undermines this form of temperature compensation.

During manufacture, a pressure transducer may be subjected to very high temperatures, e.g., in the range of 450° C., especially to form the joint 653. Forming the joint 653 sets an initial gap between the electrode and the diaphragm at those high temperatures. As the pressure transducer cools, the parts of the pressure transducer contract and the gap changes. As long as the portions of the transducer contract in a predictable manner, to a known position, a desired gap can be obtained in the cooled pressure transducer by appropriately setting an initial gap when the joint 653 is formed, taking the cooling effects into consideration. However, if portions of the transducer warp during cooling, then the desired gap may not be achieved. Limiting warping and other transient effects during manufacture is important to controlling the gap. During operation, a pressure transducer may also be subjected to temperature variations; however, the range of these variations will generally be much more limited than, and well within, the range of manufacturing temperatures. Consequently, if the temperature response of the pressure transducer is monitored, controlled and compensated for during manufacture, the temperature response will also be predictable during operation of the pressure transducer.

Figure 18B:
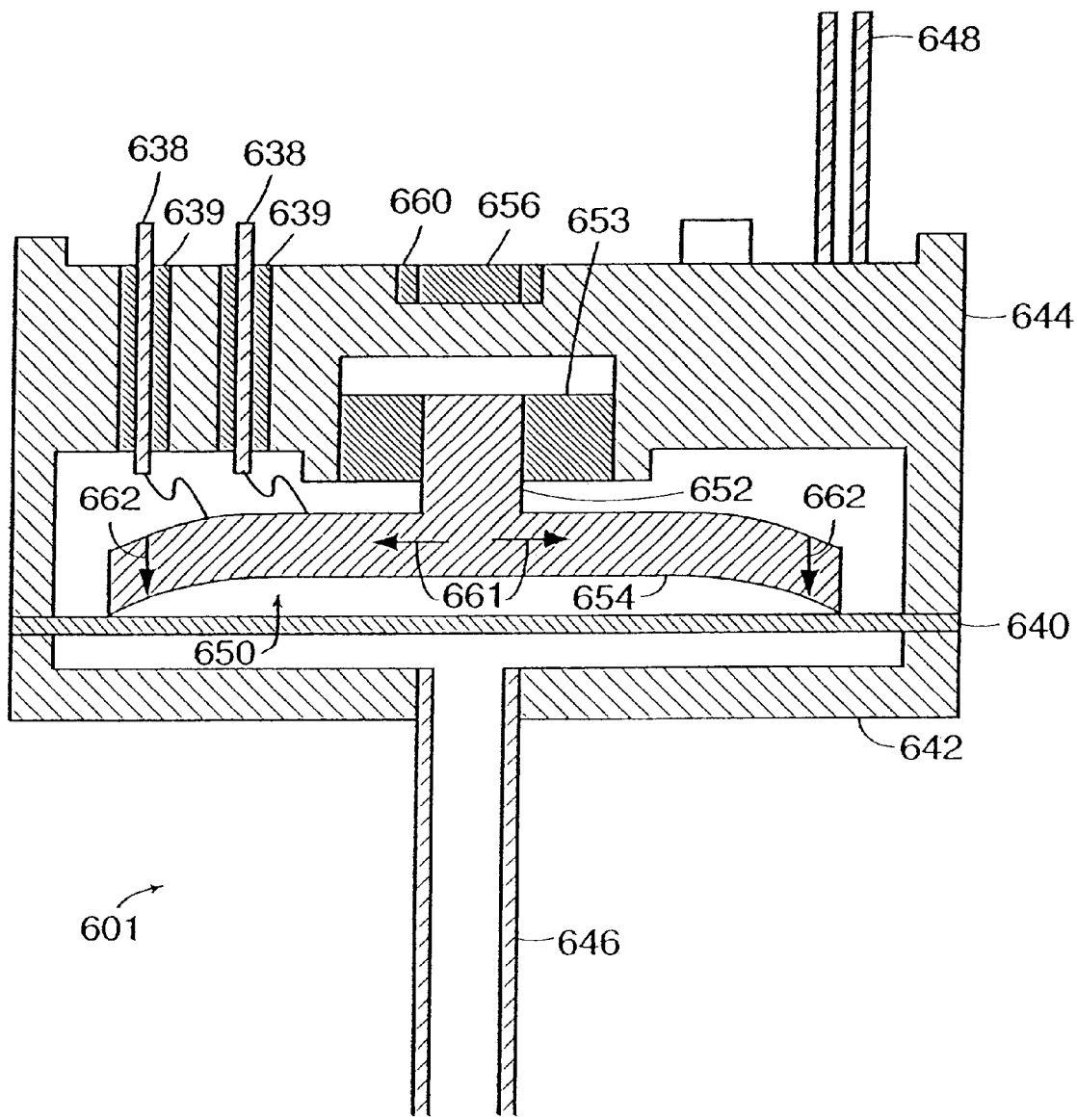
FIG. 18B is a cross-sectional view of a capacitive pressure transducer constructed according to another embodiment of the present invention, showing warping of the electrode due to thermal stress.

The groove 655 reduces transient changes in the shape of disk portion 654 and in the relative positions of portions of the pressure transducer 600 as the transducer 600 is subjected to temperature variations, either during manufacture or during operation. FIG. 18B illustrates an alternative embodiment 601 of a transducer having a ceramic post in accordance with the present invention. FIG. 18B further illustrates warping of the electrode disk 650 in response to temperature changes, in the absence of a groove such as groove 655. As the pressure transducer 601 is heated, the gap between the diaphragm 640 and the lower surface of the electrode 654 increases as the metallic housing 644 expands faster than the ceramic electrode 654. Also, as the sensor 601 is heated, the post portion 652 heats faster than the disk portion 654. The post portion 652 physically contacts the housing 644 through joint 653 and is heated by primarily conduction. The disk portion 654 is heated both by radiation from the sides of housing 644 and by conduction through the post 652. As the post portion 652 heats, it expands faster than the disk 654, centrally applying pressure on the disk 654 in an outward direction indicated by arrows 661. In response to the stress, disk 654 bows so that the outer edges of disk 654 move downward as illustrated and indicated by arrows 662. Thus, in a dual electrode design, as in FIG. 16, the outer electrode moves closer to the diaphragm 640 relative to the inner electrode. As the pressure transducer 601 is cooled, the reverse effect occurs. That is, as the post portion 652 cools, it contracts faster than the disk 654, pulling the disk 654 inward around its center. In response to the stress, disk 654 bows so that the outer edges of disk 654 move upward. This warping undermines the planar rejection of the pressure transducer 601 and leads to distortions in the observed capacitance and, hence, in the pressure measurements. Although the temperature effects become non-planar while the pressure transducer is in a transient state, once the pressure transducer has heated evenly, this effect disappears.

The groove 655 alleviates this problem. During the transient condition, the groove 655 reduces the inward or outward radial strain on the disk portion 654 from the post portion 652 and reduces or eliminates the bowing effect that distorts the capacitance. Various preferred positions and dimensions of the groove may be determined by finite element analysis. For example, for an electrode having a diameter of 1.6 inches and a thickness of 0.2 inches, and a post having a diameter of 0.25 inches, the groove 655 preferably has a depth of 0.1 inches and a width of 0.1 inches.

Disk portion 654 is preferably circular, but could be square or some other shape. The rod 652 could be metallized to make a conductive path or could be made of a low expansion metal alloy, such as Kovar, an alloy of nickel, iron and cobalt. The housing 614 and diaphragm 640 are each typically metal, such as Inconel and stainless steel, respectively, while other components are typically ceramic or glass.

3. Plug with Low Thermal Coefficient of Expansion

Figure 19:
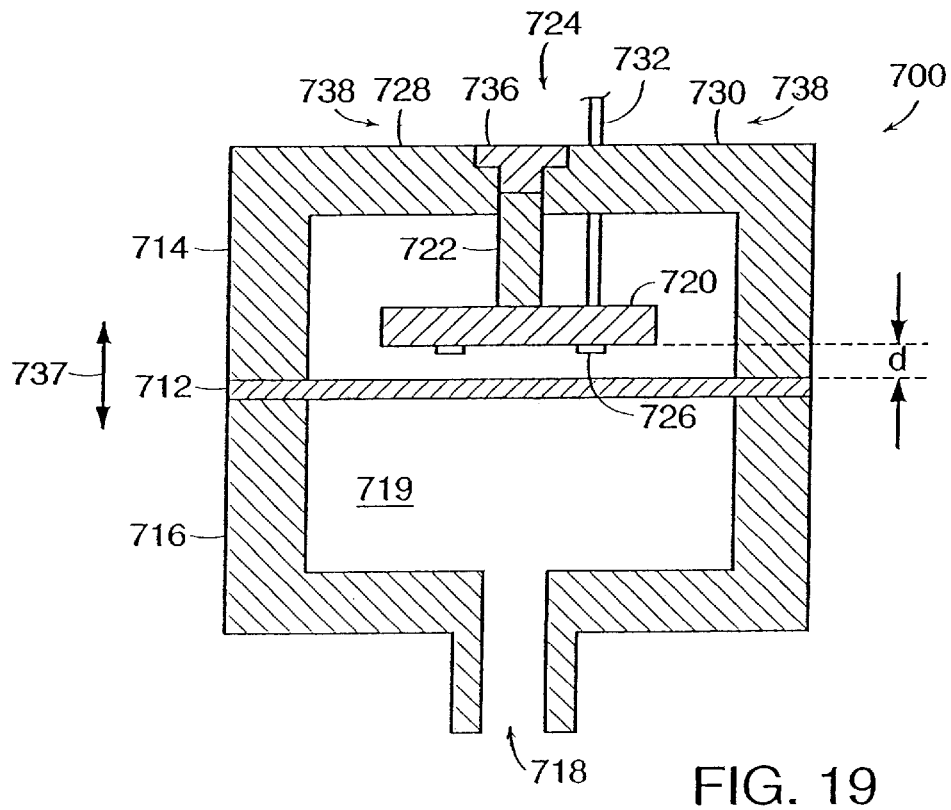
FIG. 19 is a cross-sectional view of a capacitive pressure transducer constructed according to another embodiment of the present invention.

FIG. 19 shows a portion 700 of a capacitive pressure sensor 701 (shown in FIG. 21) in accordance with another aspect of the present invention. The sensor 701 has a diaphragm 712 welded between a first housing member 714 and a second housing member 716. Housing member 716 has an opening 718 for receiving a fluid into a chamber 719.

On the other side of diaphragm 712 from which the fluid is received is an electrode 720. Electrode 720 may be made of a conductive material, or, more preferably, it includes a dielectric disc, such as a ceramic disk, with a conductive film 726 formed on its surface so that it faces diaphragm 712. Electrode 720 is connected to a support post 722, preferably made of ceramic, which extends up to an opening 724 in housing member 714.

Figure 20:
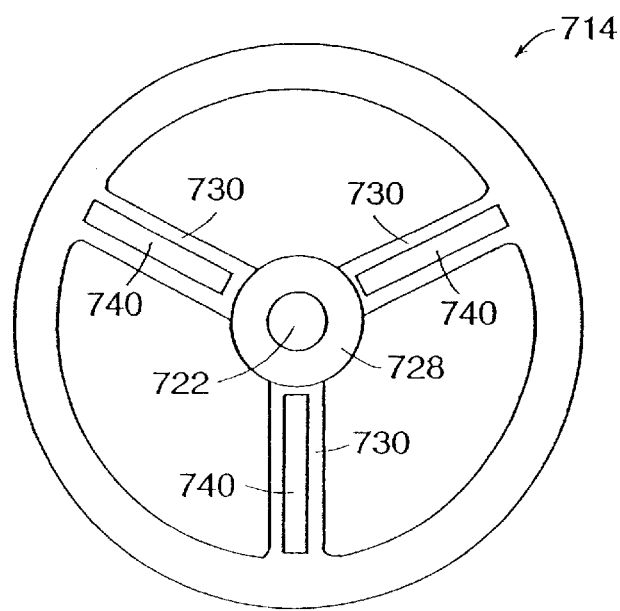
FIG. 20 is a plan view of a housing member with low TCE members according to an alternative embodiment of the present invention.

Referring also to FIG. 20, housing member 714 preferably includes a hub 728 and a number of spokes 730. However, housing member 714 could alternatively include a substantially solid electrode mounting member with an aperture instead of hub 728. Rod 722 extends into the opening 724 in the center of hub 728. Rod 722 may be attached to hub 728 by a fastener, adhesive, or other joining material. An electrical lead 732 extends between spokes 730 to electrode 720 to provide an electrical signal to the conductive film. Alternatively, lead 732 could extend through rod 722 or through an aperture in a solid electrode mounting member.

In a first embodiment of this aspect of the present invention, as shown in FIG. 19, a low thermal coefficient of expansion (TCE) plug 736 is rigidly connected to housing portion 714 in opening 724. The plug 736 preferably has a low thermal coefficient of expansion relating to the housing. The plug 736 preferably has a thermal coefficient of expansion that is less than or equal to that of the rod 722. Plug 736 may have a number of different configurations. As shown here, plug 736 has a greater diameter portion and a lesser diameter portion to define a shoulder that rests in housing member 714. Plug 736 may be rigidly connected to housing member 714 by being glassed, welded, shrink fit, or some other method for holding it rigidly in place.

Briefly, plug 736 allows for more precise gap control under typical manufacturing and operating conditions. It has been found that as the temperature that the pressure transducer is subjected to changes, plug 736, having a low coefficient of expansion, remains stable relative to the housing 714 as the sensor is heated and cooled. Typically when the sensor is cooled, plug 736 prevents inward radial movement of the housing as shown by lines 738, and creates a moment that counters a moment created where the post 722 is connected to the housing 714.

Figure 21:
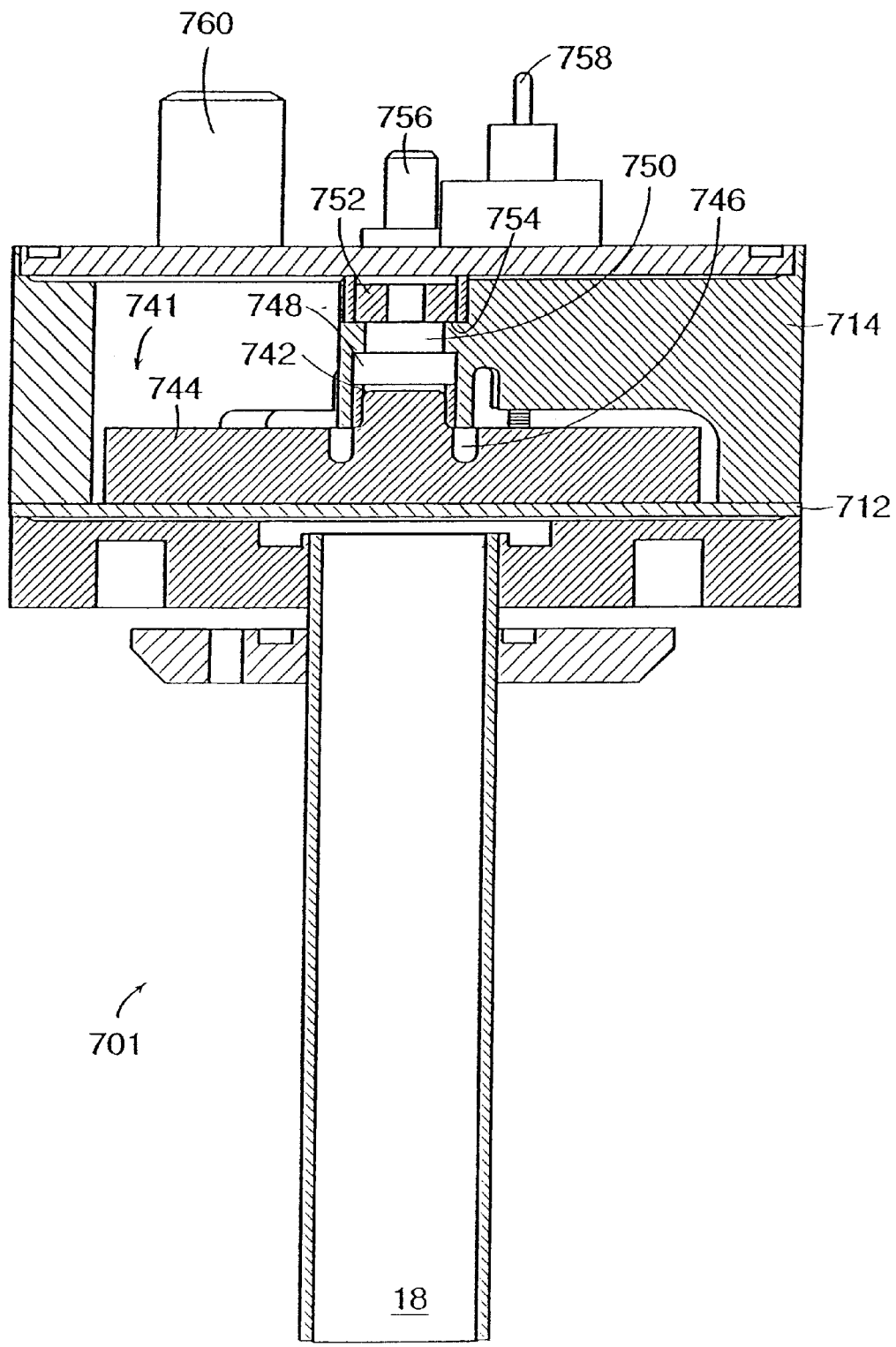
FIG. 21 is a cross-sectional view of a capacitive pressure transducer constructed according to another embodiment of the present invention.
Figure 22A:
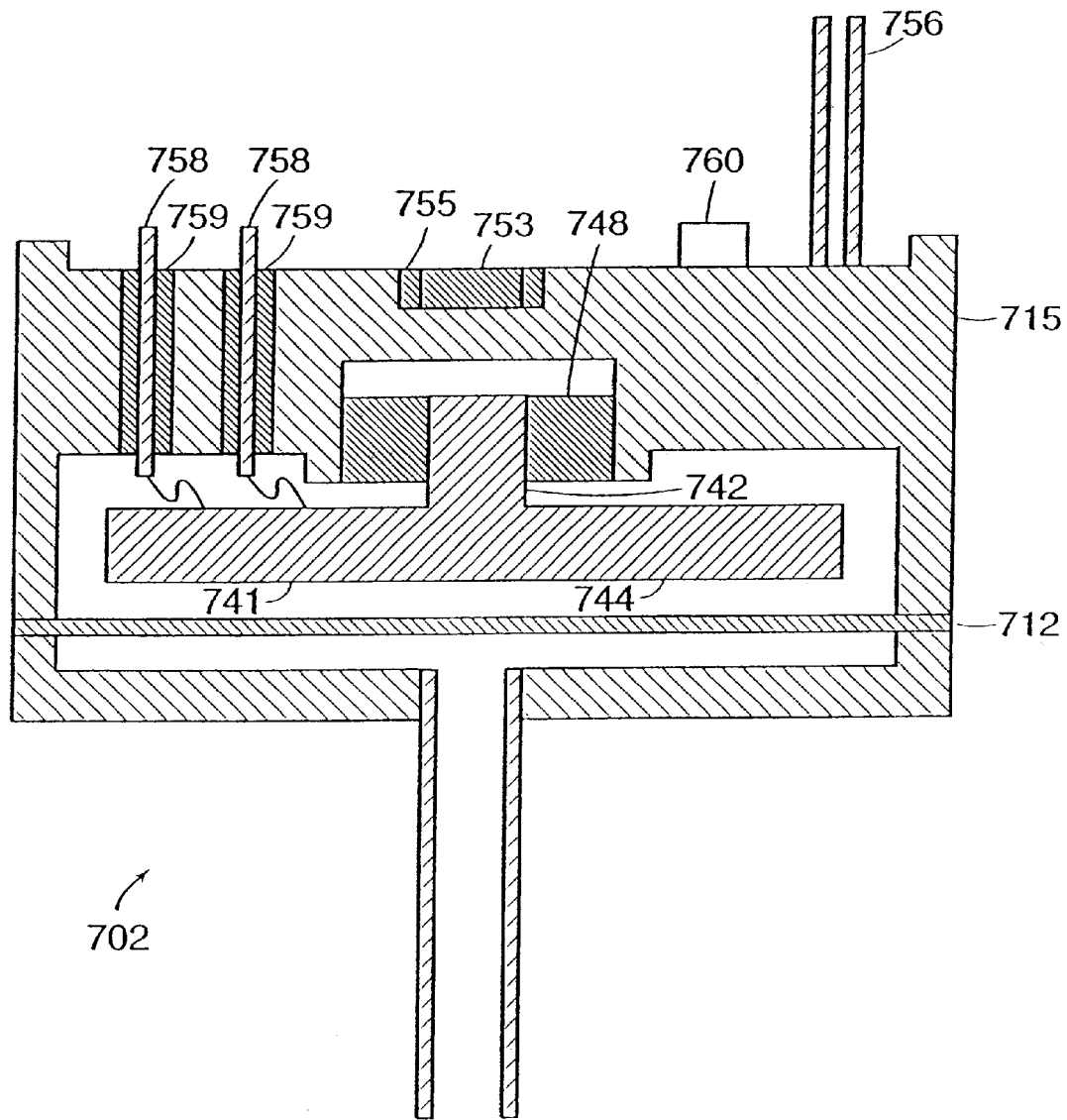
FIG. 22A is a cross-sectional view of a capacitive pressure transducer constructed according to another embodiment of the present invention.
Figure 22B:
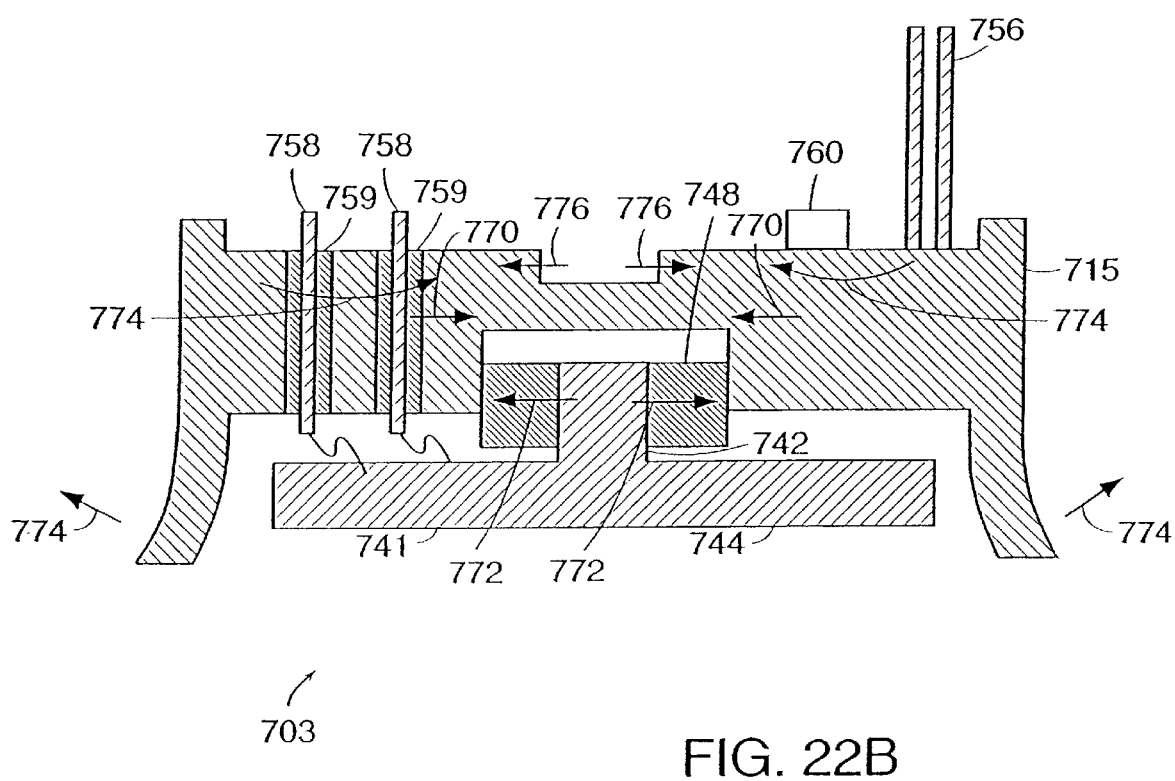
FIG. 22B is a cross-sectional view of a pressure transducer according to the embodiment shown in FIG. 22, showing forces due to thermal stress.

Additional embodiments 701 and 702 of the present invention are shown in FIGS. 21 and 22A. FIG. 22B shows a portion 703 of pressure transducer 702, drawn to illustrate the effects of temperature changes in the absence of a low TCE plug, such as plug 753. As described, during manufacture, the gap may be set, for example, by setting the electrode 720 and rod 722 on a manufacturing fixture, inserting the post 722 into the housing 714, and rigidly affixing it to the housing 714 by bonding at temperatures in the range of 450° C. As the pressure transducer cools after the manufacturing process, portions of the pressure transducer contract, such as the housing 715, and the monolithic T-shaped assembly 741, including the electrode 744, and the post 742. The housing 715, the electrode 744, and the post 742 may cool and contract at different rates, depending on their respective thermal coefficients of expansion and other properties. In particular, where the housing 715 is metallic and the electrode 744 and post 742 are ceramic, the housing 715, having a higher thermal coefficient of expansion, will typically cool and contract faster than the electrode 744 and post 742. Typically, the housing 715 will contract inward around the post 742 along the direction indicated by arrows 770. The housing 715 is inclined to contract to a position where the diameter of the aperture will be smaller than the diameter of post 742. Once the housing 715 contracts to a position where the diameter of the aperture is equal to the diameter of post 742, further contraction is inhibited by the presence of post 742. Due to the stiffness of the post 742, this contraction will put outward pressure on the housing member 715 where it is holding the post 742 along the direction indicated by arrows 772. In response to the strain, the housing member 715 will flex, the upper portion will bow downward, and the outer wall of housing 715 will bow outward around the portion near the diaphragm, as illustrated and indicated by arrows 774. Although the pressure transducer 702 may return to normal in the steady state, these changes will shift the position of the electrode 744, alter the size of the nominal gap in the finished pressure transducer 702, and result in inaccurate pressure measurements.

A low TCE member, such as plug 753, counteracts this tendency. Plug 753 has a lower thermal coefficient of expansion than either the housing 715 or the post 742. Plug 753 contracts more slowly than either one. The plug 753 counteracts the inward contraction of the housing 715 in direction 770. In particular, plug 753 applies force outward in the direction indicated by arrows 776 and prevents housing 715 from flexing inward. Because warping of the housing is reduced, plug 753 facilitates positioning of the electrode 744 and improves the accuracy of the nominal gap in the finished transducer 702. The effects of temperature changes during the manufacturing process on the gap are correlated with and predictive of the effects of temperature changes during operation. Controlling these effects improves the accuracy of the sensor, both as a manufacturing and operating parameter.

Referring to FIG. 20, in another embodiment of the present invention, strips 740 of a low TCE material are rigidly connected to spokes 730. Strips 740 may extend substantially along the lengths of spokes 730 and can be welded to the spokes. The metal could be, for example, Kovar. Strips 740 are preferably made of metal, thereby forming bimetallic spokes. These strips 740 serve a similar purpose to the plug in FIGS. 19, 21 and 22A–B.

Housing member 714 thus has an annular portion and a portion (such as the hub 728 and three spokes 730) that essentially lies in a plane parallel to diaphragm 712. The members with a low TCE (preferably lower than the TCE of housing member 714, and preferably also lower than the TCE of a dielectric material used to make disk 720), is on the portion of housing member 714 on a side facing away from diaphragm 712.

Referring to FIG. 21, where certain members are reused from FIGS. 19 and 20, an alternative embodiment 701 includes an electrode formed as a metal film on the lower side of a unitary member 740 that includes a monolithic post portion 742 and disk portion 744. Post portion 742 is rigidly connected to housing 714 with a glass seal 748 in an opening 750 of housing 714. Disk portion 744 has a groove 746 formed where post portion 742 meets disk portion 744. Groove 746, which has an inner diameter similar to the outer diameter of post portion 742, serves as a strain relief channel to help keep disk portion 744 flat.

At the upper end of opening 750 is a plug 752, made of a low TCE material as described above. As shown here, plug 752 is shaped as a cylindrical annulus with a hole along its axis (like a washer) and it rests in a shoulder 754 in housing 714. The plug 752 may be fixed by a glass joint or other bonding mechanism. A number of additional known items are shown here including an opening 756 for setting the pressure and allowing a vacuum to be drawn, a fixture 758 for electrical connection to the electrode, and a getter canister 760 for removing certain molecules, such as hydrogen, from the atmosphere after sealing off opening 756.

FIG. 22 illustrates an additional embodiment 702 of a pressure sensor constructed in accordance with the present invention. Pressure sensor 702 includes a unitary first housing member 715 that integrates an electrode mounting portion into a device housing and eliminates the need for a separate cover as shown with housing member 714 in FIGS. 19 and 21. Electrode 741 includes a post portion 742 and a disk portion 744. The post portion 742 of electrode 741 is centrally joined to unitary first housing member 715. Preferably, the post portion 742 extends into a recess in the lower surface of housing member 715. Electrode 741 may optionally include a groove to reduce strain on the disk portion 744 (e.g., such as groove 741 as shown in FIG. 21). The post portion may be fixed to the housing member 715 by a glass plug 748. A low TCE plug 753 reduces transient changes in the relative positioning of portions of the sensor 702 due to temperature variations. The low TCE plug 753 is positioned in the upper surface of housing member 715, opposite the recess holding the post portion 742 of the electrode 741, on the side away from the diaphragm 712. Preferably, low TCE plug 753 is circular or annular. The low TCE plug 753 may be fixed to the housing member 715 by a glass plug 755, similar to the plug 748 for the post portion 742 of the electrode 741. The low TCE plug 753 counters radial inward movement of the housing 715 as described above. First housing member 715 includes a feedthrough 758 for each conductor disposed on electrode 741. The feedthroughs 758 are insulated from the housing 715 by glass or other insulating material 759. The glass plugs 748, 755, and 759 for the electrode joint, low-TCE member and feedthroughs may be formed simultaneously during the manufacturing process.

The low TCE plugs 736, 752 and 753 and strips 740 can be made, for example, of a ceramic, such as alumina or manganese silicate (Forsterite), or a low TCE metal such as an iron, nickel, and cobalt alloy (Kovar). The TCE values for these materials are alumina (74), manganese silicate (100), and Kovar (50–60) (all TCE values are expressed as $10^{-7}/°C$.). Inconel, a material useful for the housing, has a TCE of 131. A pressure sensor incorporating a low TCE member may operate at pressures as low as in the 10 milliTorr range. The plug 736, 752 and 753 or strips 740 may have reduction of axial expansion as their sole substantial function.

Having described embodiments of the present invention, it should be apparent that modifications can be made without departing from the scope of the invention as defined by the appended claims. Since certain changes may be made in the above apparatus without departing from the scope of the invention herein involved, it is intended that all matter contained in the above description or shown in the accompanying drawing shall be interpreted in an illustrative and not a limiting sense. The capacitive pressure transducer disclosed herein has been described with circular symmetry, however, circular symmetry is not a limitation of the invention. Various shapes that have been described herein may be varied without departing from the scope of the invention. The conductive plates may have different shapes and their contours need not correspond to each other. The electrodes need not be disposed concentrically with respect to the housing or with respect to each other. The second electrode need not surround the first electrode. For example, two semi-circular electrodes could be disposed side-by-side. The conductive wires that permit electrical connection of the conductive plates to circuitry via the feedthroughs could contact the conductive plates directly, passing through the spaces between the spokes, rather than via the conductive supports of the electrodes. Although a dielectric plug is described as a preferred way of attaching the electrode in certain aspects of the present invention, the electrode may also be joined to the hub by an adhesive, for example. Also, the conductive plates are not necessarily coplanar with a lower surface of the P_r body. For example, the P_r body could incorporate a spacer in a monolithic formation with the P_r body. Although particular examples of alternative design options have been described herein, these examples are provided by way of example and are not exhaustive.

What is claimed is:

1. A pressure transducer assembly, comprising:
(A) a housing member defining an interior cavity, said housing member having a first coefficient of thermal expansion;
(B) a diaphragm mounted in said housing member and dividing said interior cavity into a first chamber and a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;
(C) an electrode disposed in said first chamber and joined to said housing member, said electrode including a conductor, said electrode having a second coefficient of thermal expansion, said second coefficient being different from said first coefficient; and
(D) a low thermal coefficient of expansion member rigidly connected to said housing member proximate where said electrode is joined to said housing member, said low thermal coefficient of expansion member having a third coefficient of thermal expansion, said third coefficient being lower than said first and second coefficients.

2. The assembly of claim 1, wherein said housing member has an opening, a portion of said electrode extending into said opening, said low thermal coefficient of expansion member including a plug in said opening.

3. The assembly of claim 1, said housing member having a portion that extends substantially parallel to said diaphragm, said portion including an opening, said electrode being joined to said housing member at said opening, said portion having a surface facing away from said diaphragm, said low thermal coefficient of expansion member being disposed on said surface facing away from said diaphragm.

4. The assembly of claim 3, wherein said low thermal coefficient of expansion member is formed as a strip.

5. The assembly of claim 1, wherein said housing member is made of metal and said low thermal coefficient of expansion member is made of ceramic.

6. The assembly of claim 1, wherein said housing member includes a hub-and-spoke assembly in the first chamber and the electrode is joined at the hub.

7. The assembly of claim 1, wherein said housing member has an annular portion and a portion that is substantially parallel to the diaphragm, the low thermal coefficient of expansion member being disposed on the portion of the housing member that is substantially parallel to the diaphragm.

8. The assembly of claim 1, further comprising a joining element to connect said electrode to said housing.

9. A pressure transducer assembly comprising:
(A) a body defining an interior cavity;
(B) a diaphragm mounted in said body and dividing said interior cavity into a first chamber and a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;
(C) an electrode mounting defining an aperture in said first chamber;

(D) a first electrode having a first conductive plate and a first support that are both metallic;

(E) a second electrode having a second conductive plate and a second support that are both metallic; and (F) a dielectric material at least partially disposed in said aperture, said dielectric material joining said first electrode and said second electrode to said electrode mounting and insulating said first electrode from said second electrode.

10. The assembly of claim 9, wherein a surface of said first conductive plate proximate to the diaphragm and a surface of said second conductive plate proximate to the diaphragm are coplanar.

11. The assembly of claim 10, wherein said the surfaces of said first and second conductive plates proximate to said diaphragm are coplanar with an intermediate surface of said body.

12. The assembly of claim 11, further comprising an annular spacer disposed between the intermediate surface of said body and the diaphragm.

13. The assembly of claim 10, wherein said first conductive plate is substantially circular and said second conductive plate is substantially annular and said second conductive plate substantially surrounds said first conductive plate.

14. The assembly of claim 13, wherein said first conductive plate and said second conductive plate are concentric.

15. The assembly of claim 14, wherein said second support has a tubular portion, said first support extending into said tubular portion.

16. The assembly of claim 15, said dielectric material having a first annular portion and a annular second portion, the first annular portion joining the first support to the second support and the second annular portion joining the second support to the housing member.

17. The assembly of claim 16, the second support having a tubular portion enclosing the first support, the first support and the tubular portion extending into the aperture, the dielectric material joining the first support and the tubular portion and the housing in said aperture.

18. The assembly of claim 10, wherein said first support is formed from the same material as said first conductive plate and said second support is formed from the same material as said second conductive plate.

19. The assembly of claim 10, wherein said first support, second support and said body have substantially the same thermal coefficient of expansion.

20. A pressure transducer assembly comprising:

(A) a housing member defining an interior cavity;

(B) a diaphragm mounted in said housing member and dividing said interior cavity into a first chamber and a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;

(C) an electrode disposed in said first chamber, including a ceramic disk having a conductor disposed on a first surface facing said diaphragm and a ceramic post joined to the ceramic disk at a second surface opposite said first surface; and (D) a groove formed on said second surface around the ceramic post.

21. The assembly of claim 20, wherein said housing member defines an aperture and said ceramic post is joined to said housing member with an elastic joint in said aperture.

22. The assembly of claim 21, wherein said aperture is a recess in a surface of said housing member parallel to said diaphragm.

23. The assembly of claim 20, wherein said ceramic post is formed as a monolithic ceramic piece with said ceramic disk.

24. The assembly of claim 20, wherein said groove is circular.

25. The assembly of claim 24, wherein said groove has an inner diameter approximately equal to a diameter of said ceramic post.

26. The assembly of claim 20, wherein said groove is approximately half as deep as said ceramic disk.

27. A pressure transducer assembly comprising:

(A) a body having an interior surface and defining an interior cavity;

(B) a diaphragm mounted in said body and dividing said interior cavity into a first chamber and a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;

(C) a hub disposed in said first chamber;

(D) one or more spokes disposed in said first chamber, each of said spokes extending from a first end to a second end, said first end of each of said spokes contacting said interior surface, said second end of each of said spokes contacting said hub;

(E) a conductor disposed in said first chamber, said conductor being connected to said hub, a capacitance between said conductor and said diaphragm being representative of a difference between said pressures in said first and second chambers.

28. The assembly of claim 27, wherein said spokes define reentrant grooves.

29. The assembly of claim 27, wherein said case, said spokes, and said hub are of a monolithic construction.

* * * * *